US007474791B2

(12) United States Patent
Berkner et al.

(10) Patent No.: US 7,474,791 B2
(45) Date of Patent: *Jan. 6, 2009

(54) CONTENT AND DISPLAY DEVICE DEPENDENT CREATION OF SMALLER REPRESENTATIONS OF IMAGES

(75) Inventors: Kathrin Berkner, Menlo Park, CA (US); Ramesh Neelamani, Houston, TX (US); Gregory J. Wolff, Redwood City, CA (US); Martin Boliek, San Francisco, CA (US); Peter E. Hart, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 388 days.

This patent is subject to a terminal disclaimer.

(21) Appl. No.: 11/334,175

(22) Filed: Jan. 17, 2006

(65) Prior Publication Data
US 2007/0047841 A1   Mar. 1, 2007

Related U.S. Application Data

(63) Continuation of application No. 10/044,603, filed on Jan. 10, 2002, now Pat. No. 7,095,907.

(51) Int. Cl.
*G06K 9/36* (2006.01)
(52) U.S. Cl. .................. 382/232; 382/240; 382/282
(58) Field of Classification Search ............... 382/240, 382/243, 249, 282
See application file for complete search history.

(56) References Cited

U.S. PATENT DOCUMENTS

| | | | |
|---|---|---|---|
| 3,580,655 A | 5/1971 | Leith et al. | |
| 3,950,103 A | 4/1976 | Schmidt-Weinmar | |
| 4,136,954 A | 1/1979 | Jamieson | |
| 4,155,097 A | 5/1979 | Lux | |
| 4,190,861 A | 2/1980 | Lux | |
| 4,223,354 A | 9/1980 | Noble et al. | |
| 4,393,456 A | 7/1983 | Marshall, Jr. | |
| 4,437,087 A | 3/1984 | Petr | |
| 4,569,075 A | 2/1986 | Nussbaumer | |
| 4,599,567 A | 7/1986 | Goupillaud et al. | |

(Continued)

FOREIGN PATENT DOCUMENTS

EP          0510933 A1      10/1992

(Continued)

OTHER PUBLICATIONS

Shah, et al., "A Chip Set for Lossless Image Compression", *IEEE Journal of Solid-State Circuits*, vol. 26, No. 3, Mar. 1991, pp. 237-244.

(Continued)

*Primary Examiner*—Yosef Kassa
(74) *Attorney, Agent, or Firm*—Blakely, Sokoloff, Taylor & Zafman LLP

(57) ABSTRACT

A method and apparatus to receive an image and to create a smaller representation of the image from a wavelet representation of the image is described. The size of the smaller representation of the image is selected to compensate for the content of the image and physical properties of the display device to display the smaller representation of the image.

20 Claims, 31 Drawing Sheets

U.S. PATENT DOCUMENTS

| | | |
|---|---|---|
| 4,652,881 A | 3/1987 | Lewis |
| 4,663,660 A | 5/1987 | Fedele et al. |
| 4,674,125 A | 6/1987 | Carlson et al. |
| 4,701,006 A | 10/1987 | Perlmutter |
| 4,751,742 A | 6/1988 | Meeker |
| 4,760,563 A | 7/1988 | Beylkin |
| 4,785,348 A | 11/1988 | Fonsalas et al. |
| 4,785,349 A | 11/1988 | Keith et al. |
| 4,799,179 A | 1/1989 | Masson et al. |
| 4,805,129 A | 2/1989 | David |
| 4,815,023 A | 3/1989 | Arbeiter |
| 4,817,182 A | 3/1989 | Adelson et al. |
| 4,821,223 A | 4/1989 | David |
| 4,827,336 A | 5/1989 | Acampora et al. |
| 4,829,378 A | 5/1989 | Le Gall |
| 4,837,517 A | 6/1989 | Barber |
| 4,839,889 A | 6/1989 | Gockler |
| 4,858,017 A | 8/1989 | Torbey |
| 4,864,398 A | 9/1989 | Avis et al. |
| 4,868,868 A | 9/1989 | Yazu et al. |
| 4,881,075 A | 11/1989 | Weng |
| 4,894,713 A | 1/1990 | Delogne et al. |
| 4,897,717 A | 1/1990 | Hamilton et al. |
| 4,899,147 A | 2/1990 | Schiavo et al. |
| 4,904,073 A | 2/1990 | Lawton et al. |
| 4,918,524 A | 4/1990 | Ansari et al. |
| 4,922,544 A | 5/1990 | Stansfield et al. |
| 4,929,223 A | 5/1990 | Walsh |
| 4,929,946 A | 5/1990 | O'Brien et al. |
| 4,936,665 A | 6/1990 | Whitney |
| 4,973,961 A | 11/1990 | Chamzas et al. |
| 4,974,187 A | 11/1990 | Lawton |
| 4,982,283 A | 1/1991 | Acampora |
| 4,985,927 A | 1/1991 | Norwood et al. |
| 4,987,480 A | 1/1991 | Lippman et al. |
| 4,999,705 A | 3/1991 | Puri |
| 5,000,183 A | 3/1991 | Bonnefous |
| 5,001,764 A | 3/1991 | Wood et al. |
| 5,014,134 A | 5/1991 | Lawton et al. |
| 5,018,210 A | 5/1991 | Merryman et al. |
| 5,049,992 A | 9/1991 | Citta et al. |
| 5,049,993 A | 9/1991 | Le Gall et al. |
| 5,068,911 A | 11/1991 | Resnikoff et al. |
| 5,072,308 A | 12/1991 | Lin et al. |
| 5,073,964 A | 12/1991 | Resnikoff |
| 5,081,645 A | 1/1992 | Resnikoff et al. |
| 5,095,447 A | 3/1992 | Manns et al. |
| 5,097,261 A | 3/1992 | Langdon, Jr. et al. |
| 5,097,331 A | 3/1992 | Chen et al. |
| 5,101,280 A | 3/1992 | Moronaga et al. |
| 5,101,446 A | 3/1992 | Resnikoff et al. |
| 5,103,306 A | 4/1992 | Weiman et al. |
| 5,109,451 A | 4/1992 | Aono et al. |
| 5,121,191 A | 6/1992 | Cassereau et al. |
| 5,124,930 A | 6/1992 | Nicholas et al. |
| 5,128,757 A | 7/1992 | Citta et al. |
| 5,128,791 A | 7/1992 | Le Gall et al. |
| 5,148,498 A | 9/1992 | Resnikoff et al. |
| 5,152,953 A | 10/1992 | Ackermann |
| 5,156,943 A | 10/1992 | Whitney |
| 5,173,880 A | 12/1992 | Duren et al. |
| 5,182,645 A | 1/1993 | Breeuwer et al. |
| 5,223,926 A | 6/1993 | Stone et al. |
| 5,235,434 A | 8/1993 | Wober |
| 5,241,395 A | 8/1993 | Chen |
| 5,262,958 A | 11/1993 | Chui et al. |
| 5,276,525 A | 1/1994 | Gharavi |
| 5,315,670 A | 5/1994 | Shapiro |
| 5,321,776 A | 6/1994 | Shapiro |
| 5,335,016 A | 8/1994 | Nakagawa |
| 5,347,479 A | 9/1994 | Miyazaki |
| 5,349,348 A | 9/1994 | Anderson et al. |
| 5,379,355 A | 1/1995 | Allen |
| 5,381,145 A | 1/1995 | Allen et al. |
| 5,384,869 A | 1/1995 | Wilkinson et al. |
| 5,412,741 A | 5/1995 | Shapiro |
| 5,414,780 A | 5/1995 | Carnahan |
| 5,416,604 A | 5/1995 | Park |
| 5,420,891 A | 5/1995 | Akansu |
| 5,442,458 A | 8/1995 | Rabbani et al. |
| 5,453,945 A | 9/1995 | Tucker et al. |
| 5,455,874 A | 10/1995 | Ormsby et al. |
| 5,481,308 A | 1/1996 | Hartung et al. |
| 5,495,292 A | 2/1996 | Zhang et al. |
| 5,497,435 A | 3/1996 | Berger |
| 5,511,151 A | 4/1996 | Russell et al. |
| 5,534,925 A | 7/1996 | Zhong |
| 5,537,493 A | 7/1996 | Wilkinson |
| 5,541,594 A | 7/1996 | Huang et al. |
| 5,546,477 A | 8/1996 | Knowles et al. |
| 5,563,960 A | 10/1996 | Shapiro |
| 5,566,089 A | 10/1996 | Hoogenboom |
| 5,602,589 A | 2/1997 | Vishwanath et al. |
| 5,610,729 A | 3/1997 | Nakajima ............... 358/463 |
| 5,631,977 A | 5/1997 | Koshi |
| 5,638,498 A | 6/1997 | Tyler et al. |
| 5,657,085 A | 8/1997 | Katto |
| 5,701,367 A | 12/1997 | Koshi et al. |
| 5,717,789 A | 2/1998 | Anderson et al. |
| 5,754,793 A | 5/1998 | Eom et al. |
| 5,808,683 A | 9/1998 | Tong et al. |
| 5,809,176 A | 9/1998 | Yajima |
| 5,850,482 A | 12/1998 | Meany et al. |
| 5,867,602 A | 2/1999 | Zandi et al. |
| 5,880,856 A | 3/1999 | Ferriere |
| 5,966,465 A | 10/1999 | Keith et al. |
| 5,995,644 A | 11/1999 | Lai et al. ............... 382/131 |
| 6,020,975 A | 2/2000 | Chen et al. |
| 6,026,198 A | 2/2000 | Okada |
| 6,041,143 A * | 3/2000 | Chui et al. ............... 382/232 |
| 6,055,340 A | 4/2000 | Nagao ..................... 382/261 |
| 6,088,062 A | 7/2000 | Kanou et al. |
| 6,101,279 A | 8/2000 | Nguyen et al. |
| 6,118,902 A | 9/2000 | Knowles |
| 6,121,970 A | 9/2000 | Guedalia |
| 6,128,413 A | 10/2000 | Benamara |
| 6,141,452 A | 10/2000 | Murao ..................... 382/240 |
| 6,160,846 A | 12/2000 | Chiang |
| 6,201,897 B1 | 3/2001 | Nixon |
| 6,226,412 B1 | 5/2001 | Schwab ..................... 382/232 |
| 6,229,929 B1 | 5/2001 | Lynch et al. |
| 6,236,765 B1 | 5/2001 | Archarya |
| 6,237,010 B1 | 5/2001 | Hui et al. |
| 6,263,109 B1 | 7/2001 | Ordentlich et al. |
| 6,263,120 B1 | 7/2001 | Matsuoka |
| 6,327,392 B1 | 12/2001 | Li |
| 6,330,666 B1 | 12/2001 | Wise et al. |
| 6,339,658 B1 | 1/2002 | Moccagatta et al. |
| 6,350,989 B1 | 2/2002 | Lee et al. |
| 6,356,668 B1 | 3/2002 | Honsinger et al. |
| 6,363,381 B1 | 3/2002 | Lee et al. ..................... 707/6 |
| 6,456,340 B1 * | 9/2002 | Margulis ..................... 348/745 |
| 6,463,181 B2 * | 10/2002 | Duarte ..................... 382/254 |
| 6,466,698 B1 | 10/2002 | Creusere |
| 6,483,946 B1 | 11/2002 | Martucci et al. |
| 6,546,143 B1 | 4/2003 | Taubman et al. |
| 6,625,321 B1 | 9/2003 | Li et al. |
| 6,650,782 B1 | 11/2003 | Joshi et al. |
| 6,668,090 B1 | 12/2003 | Joshi et al. |
| 6,707,948 B1 * | 3/2004 | Cosman et al. ............ 382/240 |
| 6,785,411 B1 * | 8/2004 | Kitajima et al. ............ 382/133 |
| 6,975,753 B2 * | 12/2005 | Matsuura et al. ............ 382/132 |
| 6,978,211 B2 * | 12/2005 | Soliman et al. ................ 702/13 |
| 6,985,630 B2 * | 1/2006 | Kajiwara ..................... 382/233 |

| | | | |
|---|---|---|---|
| 7,024,045 B2* | 4/2006 | McIntyre | 382/239 |
| 7,212,678 B2* | 5/2007 | Brown et al. | 382/240 |
| 7,236,637 B2* | 6/2007 | Sirohey et al. | 382/240 |
| 2001/0021223 A1 | 9/2001 | Andrew | |
| 2001/0047517 A1 | 11/2001 | Christopoulos et al. | |
| 2002/0057385 A1 | 5/2002 | Sun et al. | 348/739 |
| 2003/0110299 A1 | 6/2003 | Larsson et al. | |

FOREIGN PATENT DOCUMENTS

| | | |
|---|---|---|
| EP | 0593013 A2 | 4/1994 |
| EP | 0611051 A1 | 8/1994 |
| EP | 0622741 A2 | 11/1994 |
| EP | 701375 A2 | 3/1996 |
| EP | 0967556 A2 | 12/1999 |
| EP | 1035511 A2 | 9/2000 |
| EP | 1164781 A1 | 12/2001 |
| GB | 2 211 691 A | 7/1989 |
| GB | 2 284 121 A | 5/1995 |
| GB | 2 285 374 A | 7/1995 |
| GB | 2 293 733 A | 4/1996 |
| GB | 2 293 734 A | 4/1996 |
| GB | 2 303 030 A | 2/1997 |
| GB | 2 303 031 A | 2/1997 |
| GB | 2 341 035 A | 3/2000 |
| JP | 406038193 A | 7/1992 |
| JP | 06-245077 | 9/1994 |
| JP | 6-350989 | 12/1994 |
| JP | 7-79350 | 3/1995 |
| WO | WO 88/10049 | 12/1988 |
| WO | WO 91/03902 | 3/1991 |
| WO | WO 91/18361 | 11/1991 |
| WO | WO 93/10634 | 5/1993 |
| WO | WO 94/17492 | 8/1994 |
| WO | WO 94/23385 | 10/1994 |
| WO | WO 95/19683 | 7/1995 |
| WO | WO 96/09718 | 3/1996 |
| WO | WO 00/49571 | 8/2000 |
| WO | WO 01/16764 A1 | 3/2001 |

OTHER PUBLICATIONS

Shapiro, J. M., "An Embedded Hierarchical Image Coder Using Zerotrees of Wavelet Coefficients", *IEEE*, 1993, pp. 214-223.
Shapiro, J. M., "Embedded Image Coding Using Zerotrees of Wavelet Coefficients", *IEEE Transactions on Signal Processing*, Dec. 1993, No. 12, pp. 3445-3462.
Smith, et al., "Exact Reconstruction Techniques for Tree-Structured Subband Coders", IEEE Transactions on Acoustics, Speech, and Signal Processing, vol. ASSP-34, No. 3, Jun. 1986, p. 434-441.
Stoffel, et al: "A Survey Of Electronic Techniques For Pictorial Image Reproduction," IEEE Transactions On Communications, vol. COM-29, No. 12, Dec. 1981, pp. 1898-1925, XP000560531 IEEE, New York (US).
Szu, et al., "Image Wavelet Transforms Implemented by Discrete Wavelet Chips", *Optical Engineering*, Jul. 1994, vol. 33, No. 7, pp. 2310-2325.
Vetterli, Martin, "Filter Banks Allowing Perfect Reconstruction", Signal Processing 10 (1986), p. 219-244.
Vetterli, Martin, "Multi-Dimensional Sub-band Coding: Some Theory and Algorithms", Signal Processing 6 (1984) p. 97-112.
Villasenor, et al., "Filter Evaluation and Selection in Wavelet Image Compression", *IEEE*, 1994, pp. 351-360.
Westernick, et al., "Proceedings: ICASSP 87", 1987 International Conference on Acoustics, Speech, and Signal Processing, Apr. 6, 7, 8, 9, 1987, vol. 3 of 4, "Sub-band coding of Images Using Predictive Vector Quantization", p. 1378-1381.
Woods, "Subband Image Coding", 1991, pp. 101-108, 163-167, and 180-189.
Woods, et al., "Subband Coding of Images", *IEEE Transactions on Acoustics, Speech, and Signal Processing*, vol. 1 ASSP-34, No. 5, Oct. 1986, pp. 1278-1288.
Woods, et al., "Sub-band coding of Images", Proceedings ICASSP 86, Tokyo, Japan, Apr. 1986, p. 1005-1008.

Wu, et al., "New Compression Paradigms in JPEG2000", Applications of Digital Image Processing XXIII, San Diego, CA USA, Jul. 31-Aug. 3, 2000, vol. 4115, pp. 418-429, XP008013391, Proceedings of the DPIE—The International Society for Optical Engineering, 2000, SPIE-Int. Soc. Opt. Eng., USA.
Xiong, et al., "Joint Optimization of Scalar and Tree-structured Quantization of Wavelet Image Decompositions", Jan. 11, 1993, pp. 891-895.
Antonini, et al., "Image Coding Using Wavelet Transform", *IEEE Transactions on Image Processing*, vol. 1, No. 2, Apr. 1992, pp. 205-220.
Blumberg, et al., "Visual Realism and Interativity for the Internet", IEEE, 1997, pp. 269-273.
Boliek, et al., "Decoding compression with reversible embedded wavelets (CREW) codestreams", Journal of Electronic Imaging, Jul. 1998, vol. 7 (3), pp. 402-409.
Boliek, et al., "JPEG 2000 for Efficient Imaging in a Client/Server Environment", Proceeding of the PIE, SPIE, Bellingham, VA, US, vol. 4472, Jul. 31, 2001, pp. 212-223, XP008010308.
Boliek, et al., "JPEG 2000 Next Generation Image Compression System", IEEE 0-7803-6297, 45-48.
Calderbank, et al., "Wavelet Transforms That Map Integers to Integers", Aug. 1996.
Carey, et al: "Regularity-Preserving Image Interpolation", IEEE Transactions on Image Processing, vol. 8., No. 9, Sep. 1999, pp. 1293-1297, XP002246254.
Carrato, et al: "A Simple Edge-Sensitive Image Interpolation Filter", Proceedings of the International Confrence on Image Processing (ICIP) Lausanne, Sep. 16-19, 1996, New York, IEEE, US, vol. 1, pp. 711-714, XP010202493.
Chen, et al., "Wavelet Pyramid Image Coding with Predictable and Controllable Subjective Picture Quality", *IEICE Trans. Fundamentals*, vol. E76-A., No. 9, Sep. 1993, pp. 1458-1468.
Cheong, et al., "Subband Image Coding with Biorthogonal Wavelets", *IEICE Trans. Fundamentals*, vol. E75-A., No. 7, Jul. 1992, pp. 871-881.
Chrysafis, et al., "An Algorith for Low Memory Wavelet Image Compression", IEEE 0-7803-5467-2/99, p. 354-358.
Chrysafis, et al., "Line Based Reduced Memory, Wavelet Image Compression," Data Compression Conference, 1998, DCC '98, Proceedings Snowbird, UT, Mar. 1998, pp. 398-407.
Chui, et al., "Wavelets on a Bounded Interval", *Numerical Methods of Approximation Theory*, vol. 9, 1992, p. 53-75.
Crochiere, et al., "Digital Coding of Speech in Sub-bands", 1976, American Telephone and Telegraph Company, The Bell System Technical Journal, vol. 55, No. 8, Oct. 1976, p. 1069-1085.
Denk, et al., "Architectures for Lattice Structure Based Orthonormal Discrete Wavelet Transforms", *IEEE*, 1994, pp. 259-270.
Deshpande, et al., "HTTP Streaming of JPEG2000 Images", IEEE, 2001, pp. 15-19.
Dutch Search Report, 133082, Nov. 26, 1996.
Esteban, et al., "1977 IEEE International Conference on Acoustics, Speech & Signal Processing", "Application of Quadrature Mirror Filters to Split Band Voice Coding Schemes", p. 191-195.
French Search Report, FR9511023, Nov. 26, 1996.
French Search Report, FR9511024, Nov. 26, 1996.
German Search Report, Dated Mar. 21, 1997, 3 pages.
Gharavi, et al., "Proceedings: ICASSP 87", 1987 International Conference on Acoustics, Speech, and Signal Processing, Apr. 6, 7, 8, 9, 1987, vol. 4 of 4, "Application of Quadrature Mirror Filtering to the Coding of Monochrome and Color Images", p. 2384-2387.
Gharavi, et al., "Sub-band Coding of Digital Images Using Two-Dimensional Quadrature Mirror Filtering:, SPIE vol. 707 Visual Communications and Image Processing", 1986, p. 51-61.
Gordon, Benjamin M., et al., "A 1.2 mW Video-Rate 2-D Color Subband Decoder," IEEE Journal of Solid-State Circuits, IEEE Inc. New York, vol. 30, No. 12, Dec. 1, 1995, pp. 1510-1516.
Hauf, et al., "The FlashPix™ Image File Format", The Fourth Color Imaging Conference: Color Science, Systems and Application, 1996, pp. 234-238.
Howard, et al., "Fast and Efficient Lossless Image Compression", *IEEE*, 1993, pp. 351-360.

Information Technology—JPEG 2000 Image Coding System—Part 1: Core Coding System, ISO/IEC 15444-1, Dec. 15, 2000, p. 5, 14, 22.

International Search Report for Application No. GB 9518298.6, dated Nov. 8, 1995.

JPEG 2000 Part 1 Final Committee Draft Version 1.0, Image Compression Standard described in ISO/IEC 1/SC 29/WG 1 N1646, Mar. 16, 2000.

Komatsu, et al., "Reversible Subband Coding of Images", SPIE vol. 2501, pp. 676-648.

Langdon, Jr., "Sunset: A Hardware-Oriented Algorithm for Lossless Compression of Gray Scale Images", *SPIE* vol. 1444, *Image Capture, Formatting, and Display*, 1991, pp. 272-282.

Le Gall, et al., "Sub-band coding of Digital Images Using Symmetric Short Kernal Filters and Arithmetic Coding Techniques", 1988, International Conference on Acoustics, Speech and Signal Processing, pp. 761-764.

Lewis, et al., "Image Compression Using the 2-D Wavelet Transform", *IEEE Transactions on Image Processing*, vol. 1, No. 2, Apr. 1992, pp. 244-250.

Lux, P., "A Novel Set of Closed Orthogonal Functions for Picture Coding", 1977, pp. 267-274.

Marcellin, et al., "An Overview of JPEG-2000", Proceedings. DCC 2000 Snowbird, UT, USA, Mar. 28-30, 2000, pp. 523-541, XP010377392.

Meng, Teresa H., "A Wireless Portable Video-on-Demand System," VLSI Design, 1998, Proceedings Eleventh International Conference on Chennai, India 407, Jan. 1998, California, pp. 4-9.

Ohta, et al., "Wavelet Picture Coding with Transform Coding Approach", Jul. 1992, No. 7, pp. 776-784.

Padmanabhan, et al., "Feedback-Based Orthogonal Digital Filters", *IEEE Transactions on Circuits and Systems*, Aug. 1993, No. 8, pp. 512-525.

Pollara et al., "Rate-distortion Efficiency of Subband Coding with Integer Coefficient Filters", Jul. 1994, p. 419, Information Theory, 1994, IEEE.

Reeves, et al: "Multiscale-Based Image Enhancement", Electrical and Computer Engineering, 1997. Engineering Innovation: Voyage of Discovery. IEEE 1997 Canadian Conference on St. Johns, NFLD., Canada May 25-28, 1997, New York, NY. (pp. 500-503), XP010235053.

Reusens, "New Results in Subband/Wavelet Image Coding", May 1993, p. 381-385.

Said, et al., "Image Compression Using the Spatial-Orientation Tree", *IEEE*, 1993, pp. 279-282.

Said, et al., "Reversible Image Compression Via Multiresolution representation and Predictive Coding", Aug. 11, 1993, pp. 664-674.

Burton, C.A., et al: "Case Study An Empirical Investigation Of Thumbnail Image Recognition", Proceedings of Visualization Conference, pp. 115-121, 1995.

Donoho, D.L., "De-noising By Soft-Thresholding," IEEE Transactions On Information Theory, vol. 41, No. 3, pp. 613-627, May 1995.

O'Gorman, L., "The Document Spectrum For Page Layout Analysis," IEEE Transactions on Pattern Analysis and Machine Intelligence, vol. 15, No. 11, pp. 1162-1173, Nov. 1993.

Lee, K., et al: "Perception-Based Image Transcoding For Universal Multimedia Access," IEEE 2001, pp. 475-478.

Mohan, R., et al: "Adapting Multimedia Internet Content For Universal Access," IEEE Transactions on Multimedia, vol. 1, No. 1, pp. 104-114, Mar. 1999.

Uchihashi, S., et al: "Video Manga: Generating Semantically Meaningful Video Summaries," Proceedings of Seventh ACM International Multimedia Conference, Orlando, 1999.

Woodruff, A., et al: "Using Thumbnails To Search The Web," Proceedings of SIGCH'01, Seattle, Apr. 2001.

Flashpix file format, http://wwwse.kodak.com/US/en/digital/dlc/book2/chapter4/flashp3.shtml/.

Software Thumber by TawbaWare, http://members.tripod.com/~tawba/thumber.htm.

Software Thumbplus, http://www.thumbsplus.com.

\* cited by examiner

|  | 2 | 4 | 4 |
|---|---|---|---|
| 5 | 2 | 4 | 1 |
| 5 | 2 | 3 | 3 |
|  | 1 | 3 | 3 |

FIG. 18B

CONTENT AND DISPLAY DEVICE DEPENDENT CREATION OF SMALLER REPRESENTATIONS OF IMAGES

This is a continuation of application Ser. No. 10/044,603, filed on Jan. 10, 2002 now U.S. Pat. No. 7,095,907, entitled "Content and Display Device Dependent Creation of Smaller Representations of Images," incorporated by reference herein and assigned to the corporate assignee of the present invention.

RELATED APPLICATIONS

This application is related to the co-pending application entitled Header-Based Processing Of Images Compressed Using Multi-Scale Transforms, concurrently filed on Jan. 10, 2002, U.S. patent application Ser. No. 10/044,420, assigned to the corporate assignee of the present invention.

FIELD OF THE INVENTION

The invention relates generally to the field of image processing. More specifically, the invention relates to creating a smaller representation of an image.

BACKGROUND OF THE INVENTION

Thumbnails are an extremely desirable graphical user interface component for most multimedia and document applications. A thumbnail is a resized smaller version of an image representative of the full image which can be displayed in some applications by clicking on the thumbnail. The resizing is typically done by traditional smoothing followed by downsampling. In most traditional applications, such as listings on a web page, the size of a thumbnail is fixed. A common problem with those thumbnail displays is that the image information is often not recognizable for the viewer and does not provide the desired usefulness.

Newer multimedia communication tools allow a free-format composition of images of various sources on a representative canvas. In this case, the size of a thumbnail is allowed to be variable. In such an application, besides the question of what to display in a fixed-size thumbnail, the additional question arises of what constitutes a suitable thumbnail size or shape for a given image. For example, in representing a photo of a person as captured from a visitor's kiosk, a downsampled image of the face-portion of the photo would be sufficient for a thumbnail, whereas for a web document the title at full resolution might be a useful display.

The authors in Mohan, R., Smith, J. R., and Li, C.-S., "Adapting Multimedia Internet Content for Universal Access," IEEE Trans. Multimedia, Vol. 1, no. 1, pp. 104-114, 1999, describe a method for the transcoding of images to specific devices such as monitors or cell phones. In Lee, K., Chang, H. S., Choi, H., and Sull, S., "Perception-based image transcoding for universal multimedia access," which appeared in ICIP 2001, Proceedings of International Conference on Image Processing, Thessalonihi, Greece, 2001. This approach is extended to sending only specifically selected parts of an image at a specific resolution. The specification is performed by the sender and does not happen automatically.

There exist several software packages providing for thumbnail creation. These software packages focus on speed, but all of these resize the entire image to user or application defined sizes using traditional downsampling. Thus, image information is often not recognizable to the viewer.

In Woodruff, A., Faulring, A., Rosenholtz, R., Morrison, J., and Pirolli, P., "Using Thumbnails to Search the Web," Proceedings of SIGCHI'01, Seattle, April 2001, enhanced thumbnails are introduced to provide a better representation of documents. The enhancement consists of lowering the contrast in traditionally created thumbnails and superimposing keywords in larger fonts that were detected via an Optical Character Recognition (OCR) system. The result is a limited improvement at best and is only applicable to images that contain text.

The authors in Burton, C. A., Johnston, L. J., and Sonenberg, E. A., "Case study: an empirical investigation of thumbnail image recognition", Proceedings of Visualization Conference 1995, found that the filtering of images (contrast enhancement, edge enhancement) before downsampling increases a viewer's ability to recognize thumbnails. Even so, image information is often not recognizable to the viewer.

For creation of video summaries there exist methods that display groupings of video frames where the individual frames have specific sizes/resolution, as in Uchihashi, S., Foote, J., Girgensohn, A., and Boreczky, J., "Video Manga: Generating Semantically Meaningful Video Summaries," Proceedings of Seventh ACM International Multimedia Conference, Orlando 1999. The decision for resizing the frames is made by measuring the frames importance in the video sequence, not by the actual image content.

The area of page layout has been discussed in many papers. Typically, the authors assume, disadvantageously, that the image content of documents is mostly text with perhaps some small images or graphics, and perform text specific operations involving clustering techniques to determine connected components. A common method for page layout is the one described in O'Gorman, L., "The Document Spectrum for Page Layout Analysis," IEEE Trans. Image Proc., Vol. 15, no. 11, pp. 1162-1173, 1993.

One existing image file format stores multiple resolutions of an image (e.g., as created by a Laplacian pyramid). As a result, this image file format is usually disadvantageously larger than a file of a wavelet coded image. This image file format has the option of incorporating specific parameters into the file. Those parameters could be, for example, result aspect ratio, rectangle of interest, filtering or contrast adjustment. The parameters are set by the creator of the file and may or may not be used by the receiver.

SUMMARY OF THE INVENTION

A method and apparatus to receive an image and to create a smaller representation of the image from a wavelet representation of the image is described. The form of display (e.g., size, shape, multiscale collage) of the smaller representation of the image is selected to compensate for the content of the image and physical properties of the display device to display the smaller representation of the image.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
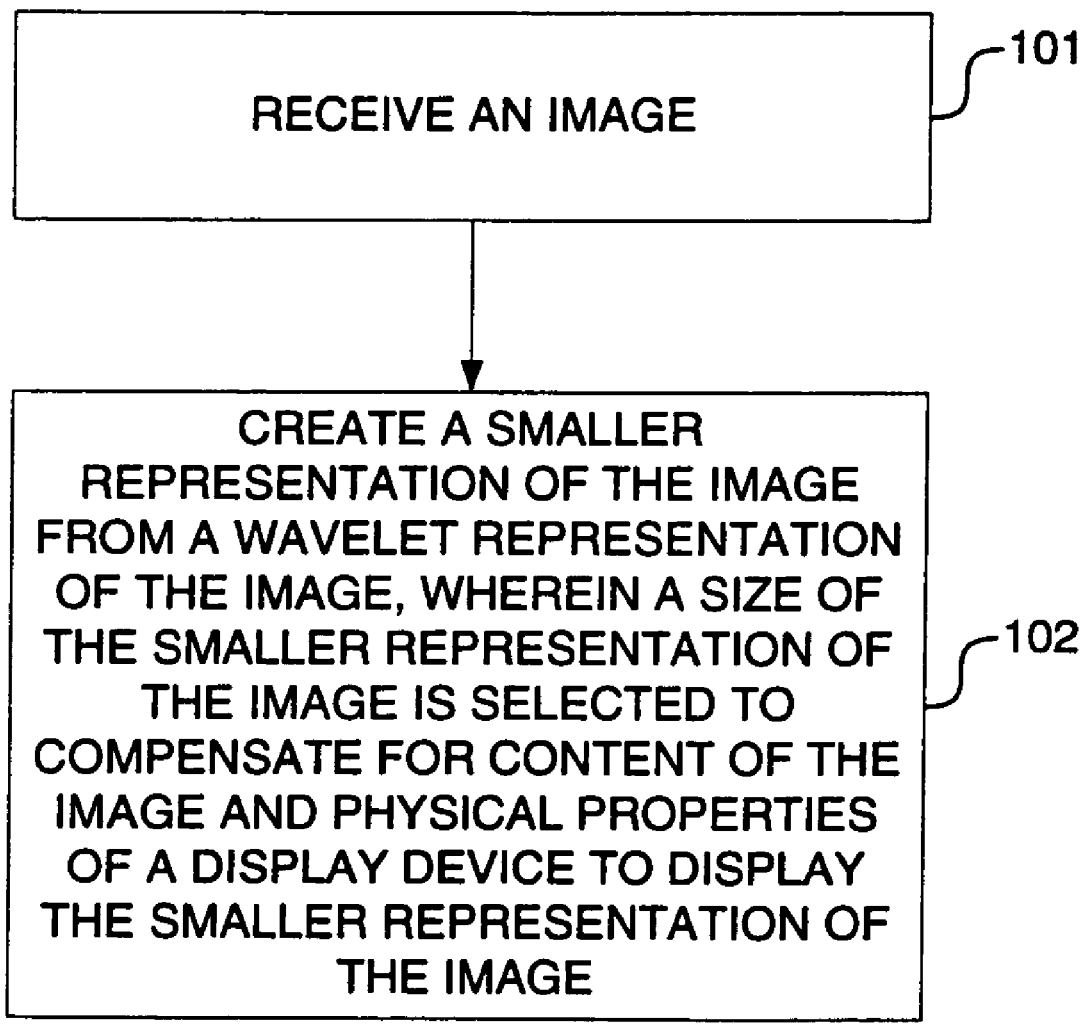
FIG. 1 is a flow diagram of one embodiment of a process for computing an image representation that is visually recognizable when being displayed on a given display device.

A method and apparatus for automatic creation of smaller-sized representations of images is described that takes into account the image content as well as the physical properties of a display device, such as, for example, but not limited to, dots per inch (dpi) resolution, absolute pixel resolution, pixels per viewing angle, gain function (gamma response), contrast, and brightness, gain function to compute an image representation that contains information that is visually recognizable when being displayed on the specific display device. The techniques described herein use a wavelet representation of an image and parameters that characterize the image content.

The techniques described herein also use parameters linked to physical properties of a display device. In a typical Internet application, an image may be displayed on several different display devices such as a monitor, a media board, a digital camera display, a personal digital assistant, or a cell phone. These devices may differ in physical properties such as, for example, dots per inch, numbers of pixels, contrast, brightness, etc.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 is a flow diagram of one embodiment of a process for computing an image representation that is visually recognizable when being displayed on a given display device. This process, like others described below, is performed by processing logic that may comprise hardware, software, or a combination of both.

Referring to FIG. 1, processing logic initially receives an image (processing block 101). Processing logic then creates a smaller representation of the image from a wavelet representation of the image (processing block 102). The size of the smaller representation of the image is selected based on the content of the image and physical properties of a display device that is to display the smaller representation of the image.

Figure 2:
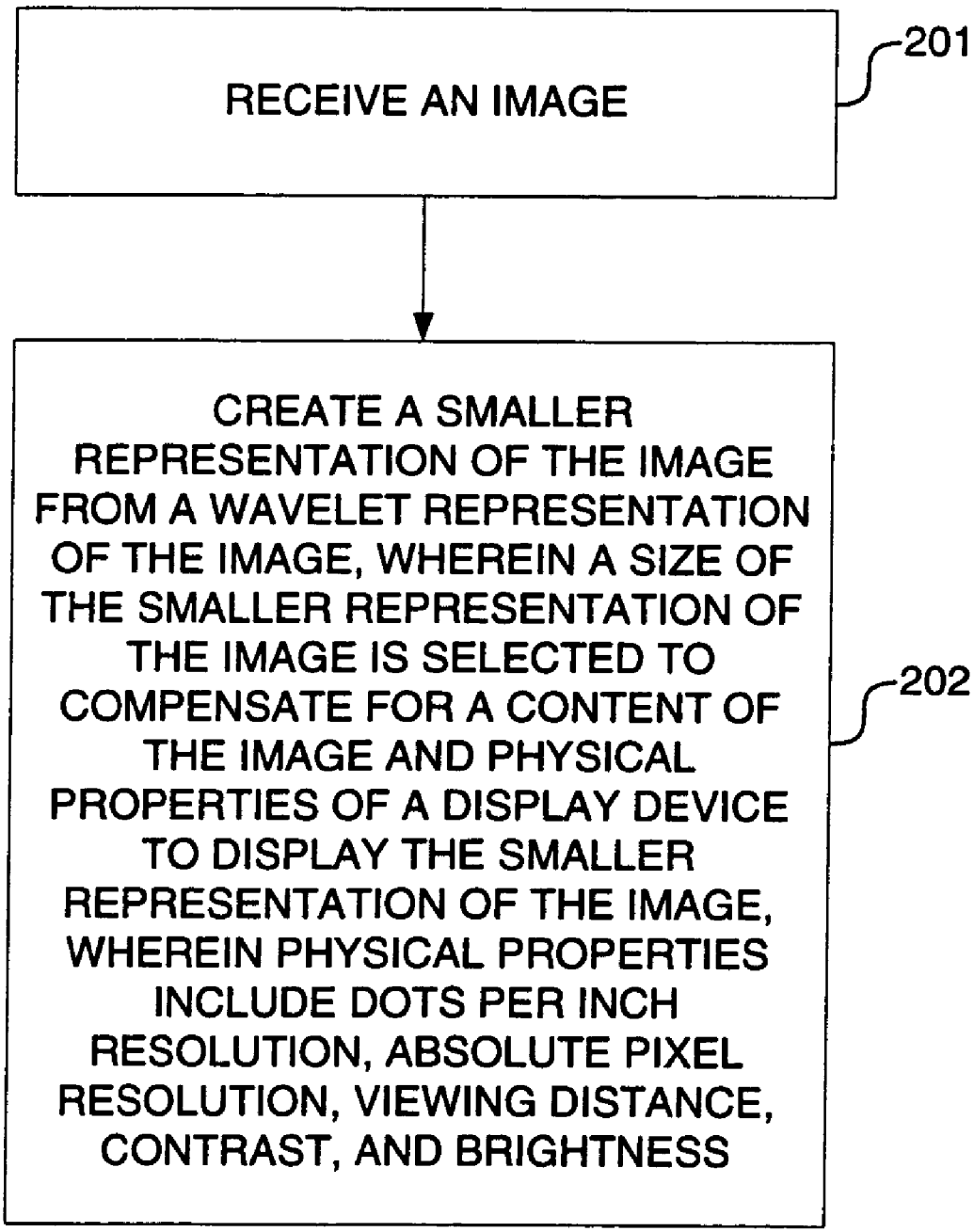
FIG. 2 is a flow diagram of one embodiment of a process for computing an image representation that is visually recognizable when being displayed on a given display device.

FIG. 2 is a flow diagram of one embodiment of a process for computing an image representation that is visually recognizable when being displayed on a given display device. Referring to FIG. 2, processing logic receives an image (processing block 201). Processing logic then creates a smaller representation of the image from a wavelet representation of the image, where the size of the smaller representation of the image is selected based on the content of the image and physical properties of a display device to display the smaller representation of the image (processing block 202). In contrast to FIG. 1, the physical properties include dots per inch (dpi) resolution, absolute pixel resolution, viewing distance, contrast, and brightness.

Determination of a Display Device Dependent Range of Downsampling Factors

Figure 3:
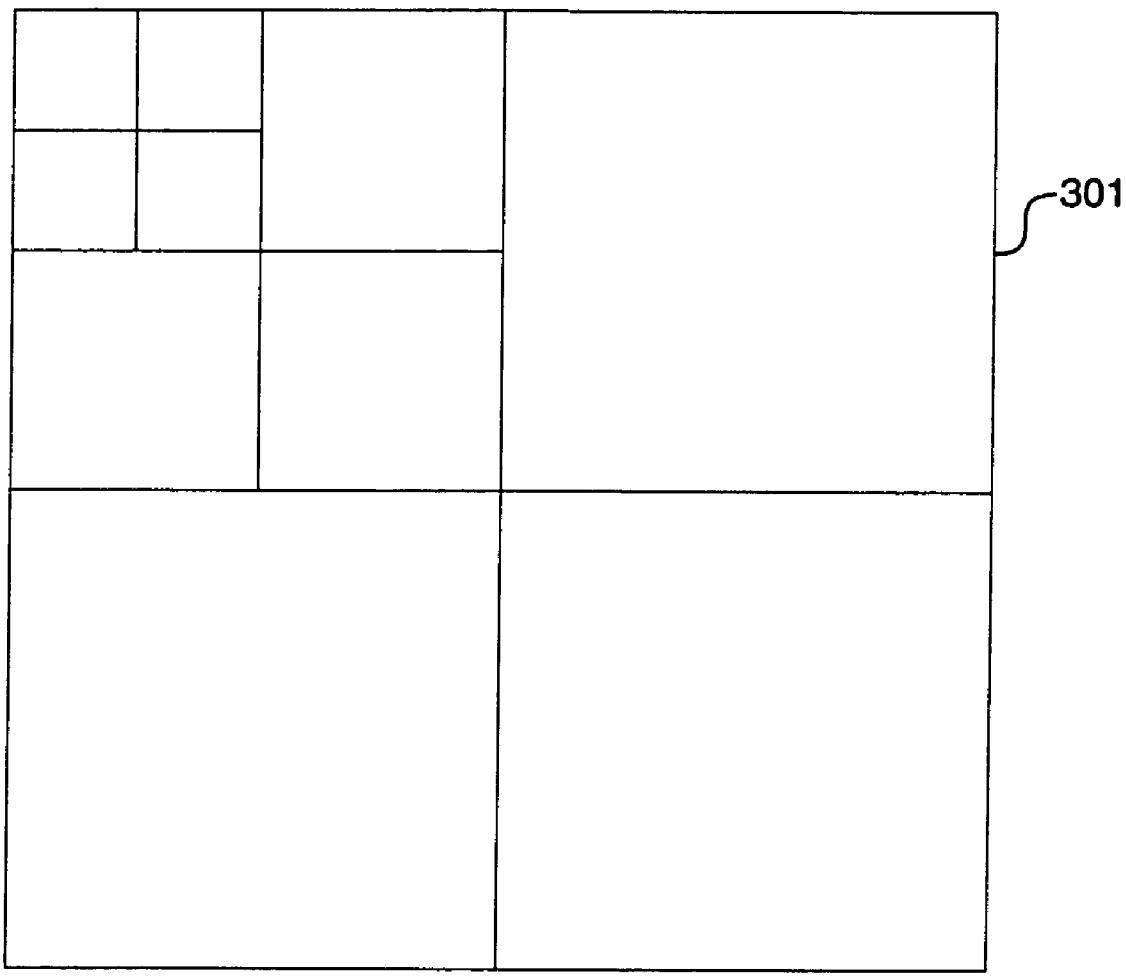
FIG. 3 illustrates a typical wavelet decomposition.

A wavelet representation separates the image information into its information at various levels of resolution $1 \ldots L$. FIG. 3 illustrates a typical wavelet decomposition. If an image 301 of size N×M is given in its wavelet decomposition as if to be downsampled by, for example, a factor of 4 in each dimension, then the inverse wavelet transform is performed on levels $3 \ldots L$. The result after this inverse transform is the LL component at level 2 (i.e., a downsampled version of the original image). The size of the downsampled image is $M/(2^2) \times N/(2^2)$. This reduced image will not contain the detail information contained in the highpass coefficients at level 1 and 2 of the wavelet decomposition.

Depending on display device parameters, a range of suitable display levels between level 1 and L can be determined as follows. In one embodiment, if the size of the image is larger than the pixel size of the display device (e.g., the image is of size 2048×2048 and the monitor resolution is of size 1024×768), then the image should be downsampled at least twice to be completely visible on the monitor display. Therefore, the absolute display resolution provides a lower bound on the number of downsampling factors (i.e., on the display level L, so called $L_{min}$).

Figure 4:
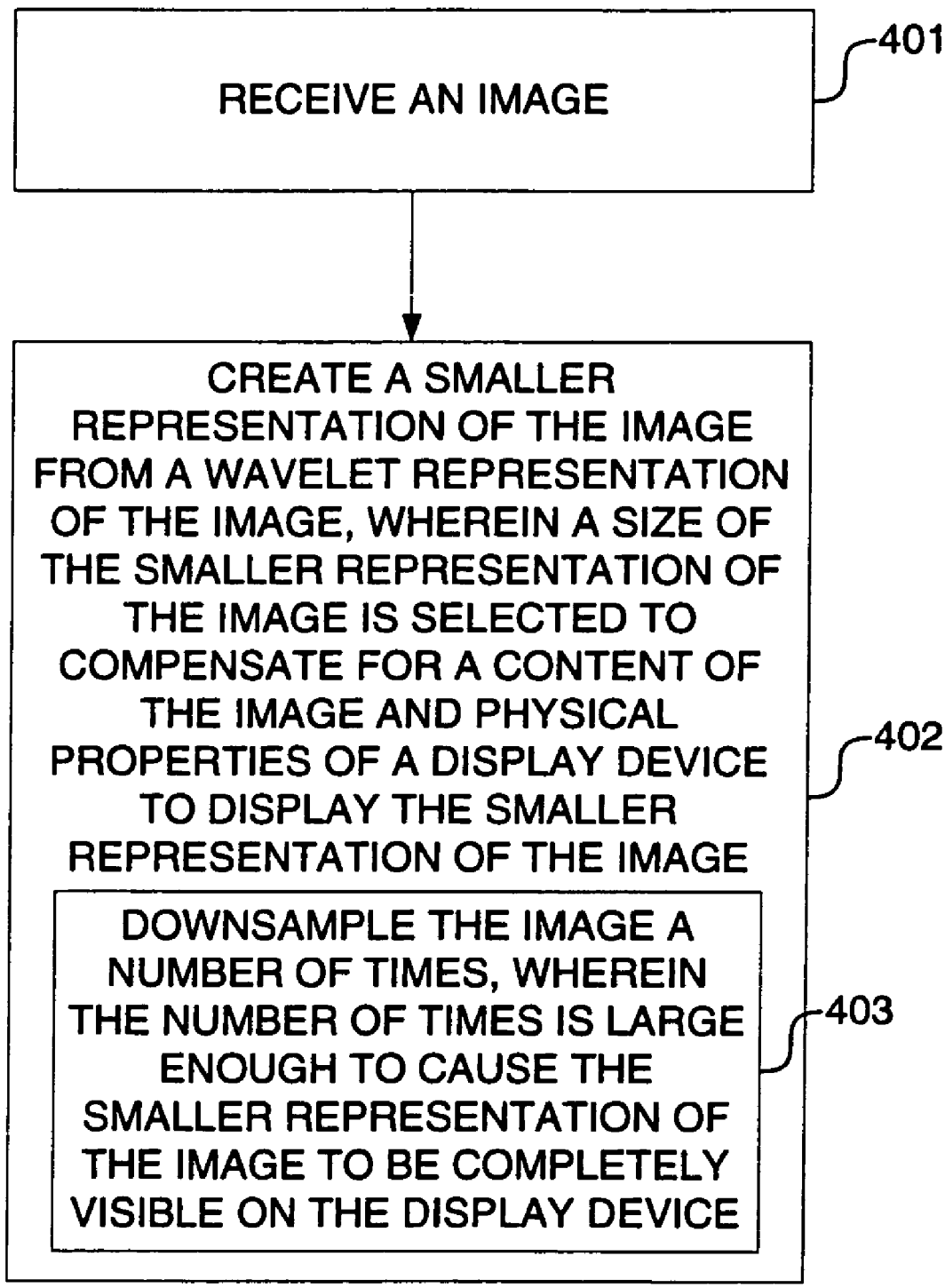
FIG. 4 is a flow diagram of one embodiment of a process for computing an image representation that is visually recognizable when being displayed on a given display device.

FIG. 4 is a flow diagram of one embodiment of a process for computing an image representation that is visually recognizable when being displayed on a given display device. Referring to FIG. 4, processing logic receives an image (processing block 401). Processing logic then creates a smaller representation of the image from a wavelet representation of the image, where the size of the smaller representation of the image is selected based on the content of the image and physical properties of a display device to display the smaller representation of the image (processing block 402). As shown in FIG. 4, as part of creating the smaller representation, processing logic downsamples the image a number of times (processing block 403). The number of times is large enough to cause the smaller representation of the image to be completely visible on the display device. For example, if an image has 2048×2046 pixels and the monitor has a 1024×768 pixel display resolution and downsampling is performed once, then the image will not fit in the display area of the monitor; however, if downsampling is performed twice, then the image will fit in the display area of the monitor.

Another factor that influences the visibility of images on displays is the relative display resolution given in dots per inch (dpi). For example, a monitor has a relative resolution of 75 dpi, whereas a printer has a resolution of 600 dpi and a large display has an estimated resolution of 25 dpi. Other tests may have other results (e.g., text recognition). As determined from subjective tests, the minimal size of a visible recognizable object or structure is a diameter of approximately 2 mm. This size can be translated into a dot size for a given dpi resolution. For a 75 dpi monitor, the minimal object diameter in dot numbers would be 6, whereas for a 600 dpi printer, it would be 47 dots. In one embodiment, the formula for determination of minimal visible object diameter in dot numbers is given by $$D_{min} = \text{(minimal object diameter in mm)} * \text{(dpi resolution)}/25.4.$$

Depending on physical properties of the display device, such as contrast and brightness, the choice of $D_{min}$ may vary a bit. In one embodiment, this variation is expressed as a constant $C_{device}$ in the formula and tuned for a specific display. In one embodiment, if contrast or brightness is small, then the constant $C_{device}$ is large.

$$D_{min} = C_{device} * (\text{minimal visible object diameter in mm}) * (\text{dpi resolution})/25.4. \quad (1)$$

$D_{min}$ also depends on the viewing distance and angle. In one embodiment, the ratio between dpi resolution and view distance is constant.

Small scale structures show up as wavelet coefficients in decomposition levels over a number of decomposition levels associated with high resolution scales. In one embodiment, to be visibly recognizable after n-times downsampling, small scale structures have a dot size D that is larger than $D_{min}$ after n-times downsampling. Therefore, the inequality $D/2^n > D_{min}$ is valid. As a result, only structures that correspond to wavelet coefficients being nonzero at levels n . . . L qualify to be visibly recognizable at the chosen display device. Thus, the levels 1 . . . n−1 do not need to be considered at all during the inverse transform, since they will not provide visually recognizable information. The level $$L_{max}(D) = \log_2(D/D_{min}) = \log_2(D) - \log_2(D_{min}) \quad (1)$$

provides an upper bound on the downsampling factor of an object of dot size diameter D. As an immediate consequence, $$\lfloor L_{max} \rfloor = \lfloor \log_2(\min(N,M)/D_{min}) \rfloor = \lfloor \log_2(\min(N,M)) - \log_2(D_{min}) \rfloor \quad (2)$$

is an upper bound on the downsampling factor for an entire image of size N×M. $L_{max}$ and $L_{min}$ form a range of possible display scales $$\lambda = [L_{min}, L_{max}]. \quad (3)$$

Figure 5:
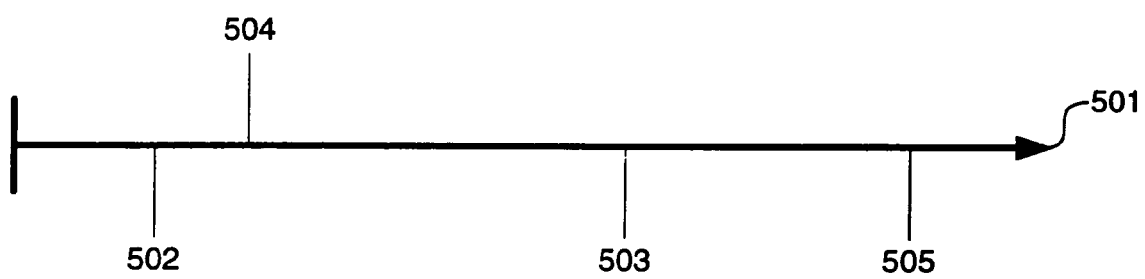
FIG. 5 illustrates multiple sampling factors (display scales)

The bound $L_{max}$ is most likely too large for most images. Often, images contain almost equal proportion of coarse and fine structures, such as natural images, or a lot of fine structures, such as text images. Depending on the ratio of coarse to fine structures, a natural image may be downsampled more times than a text image and still display visually recognizable information. Therefore, in one embodiment, the information contained in wavelet coefficients is used to determine, for a given image, the maximal downsampling factor $L_{display}$ under the constraints that $$L_{min} \leq L_{display} \leq L_{max} \quad (4)$$

and that the LL component at level $L_{display}$ contains important image information. FIG. 5 illustrates an overview of sampling factors (display scales). The factors are shown along a line of all possible downsampling factors 501. The range bounds $L_{min}$ 502 and $L_{max}$ 503 depend on display parameters, dpi resolution, absolute pixel resolution, brightness and contrast, viewing distance, and the image parameter image size. In addition to those parameters, $L_{display}$ 504 depends also on the image content. Another factor, $\log_2(\text{image size})$ 505, is also present at one extreme of the line of all possible downsampling factors 501.

Figure 6:
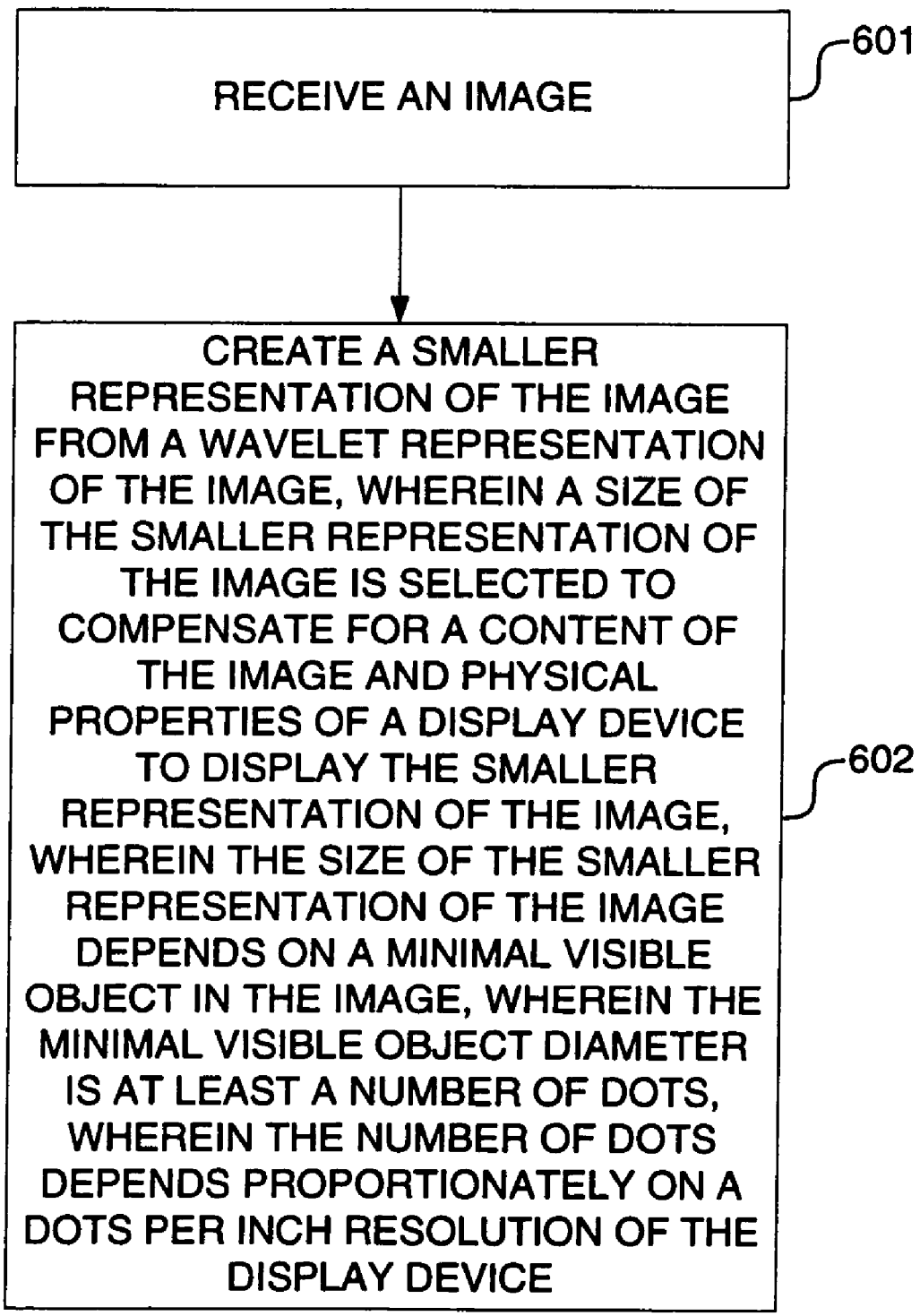
FIG. 6 is a flow diagram of one embodiment of a process for computing an image representation that is visually recognizable when being displayed on a given display device.

FIG. 6 is a flow diagram of one embodiment of a process for computing an image representation that is visually recognizable when being displayed on a given display device. Referring to FIG. 6, processing logic receives an image (processing block 601). Processing logic then creates a smaller representation of the image from a wavelet representation of the image, where the size of the smaller representation of the image is selected based on the content of the image and physical properties of a display device to display the smaller representation of the image (processing block 602). In this case, the size of the smaller representation of the image depends on a minimal visible object diameter of an object in the image. The minimal visible object diameter is at least a number of dots. The number of dots depends proportionately on a dots per inch resolution of the display device.

Figure 7:
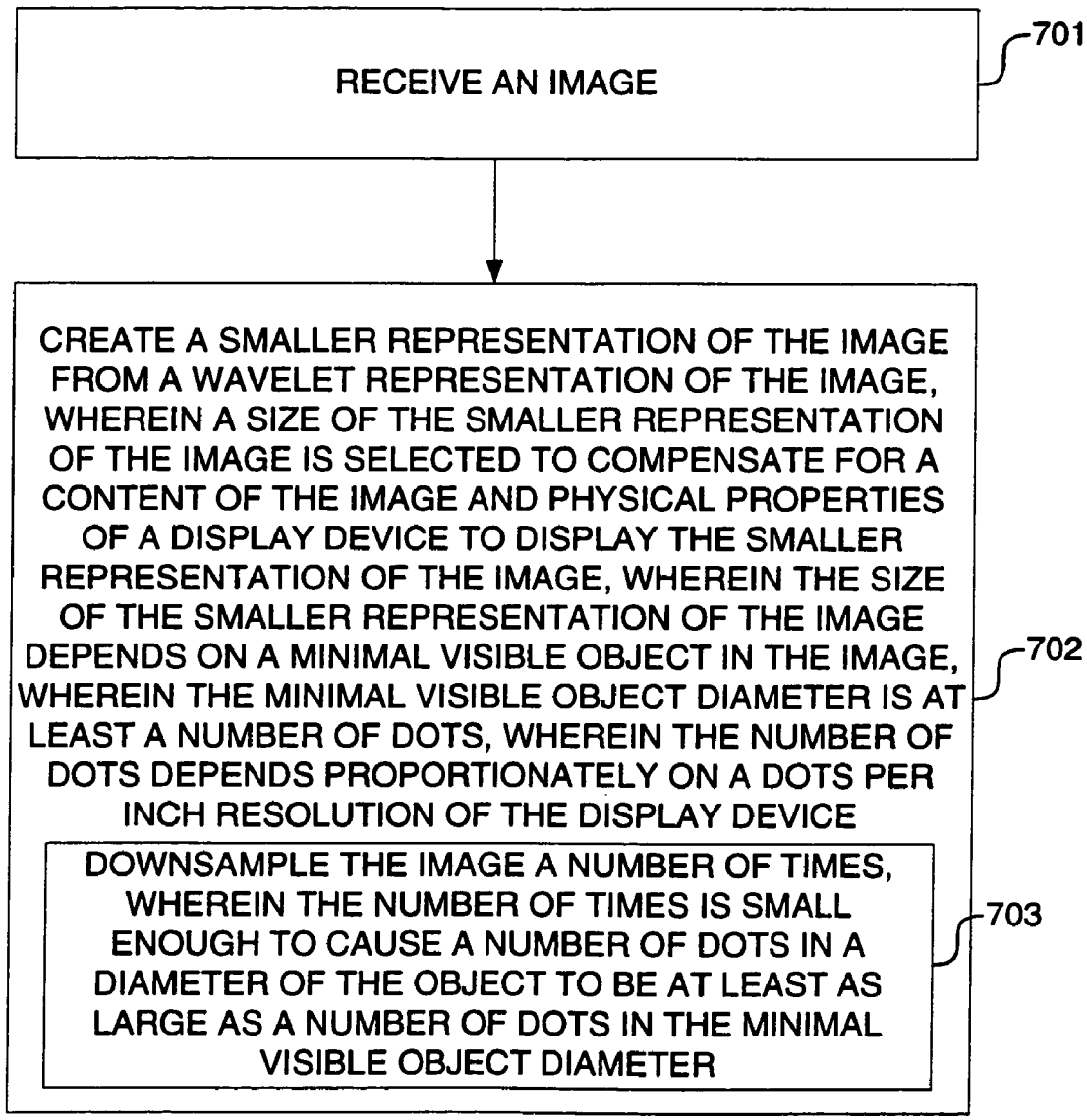
FIG. 7 is a flow diagram of one embodiment of a process for computing an image representation that is visually recognizable when being displayed on a given display device.

FIG. 7 is a flow diagram of one embodiment of a process for computing an image representation that is visually recognizable when being displayed on a given display device. Referring to FIG. 7, processing logic receives an image (processing block 701). Processing logic then creates a smaller representation of the image from a wavelet representation of the image, where the size of the smaller representation of the image is selected based on the content of the image and physical properties of a display device to display the smaller representation of the image (processing block 702). In this case, the size of the smaller representation of the image depends on a minimal visible object diameter of an object in the image. The minimal visible object diameter is at least a number of dots. The number of dots depends proportionately on a dots per inch resolution of the display device. As shown in FIG. 7, as part of creating the smaller representation, processing logic downsamples the image a number of times (processing block 703). The number of times is small enough to cause a number of dots in a diameter of the object to be at least as large as a number of dots in the minimal visible object diameter. For example, in the case where the minimal object diameter is 20 dots and the object diameter is 100 dots, then downsampling twice results in a diameter of 25 dots. Downsampling three times results in a diameter that is 12 dots. Since the 12 dots is less than 20 dots, the number of times the object can be downsampled is only two.

Figure 8:
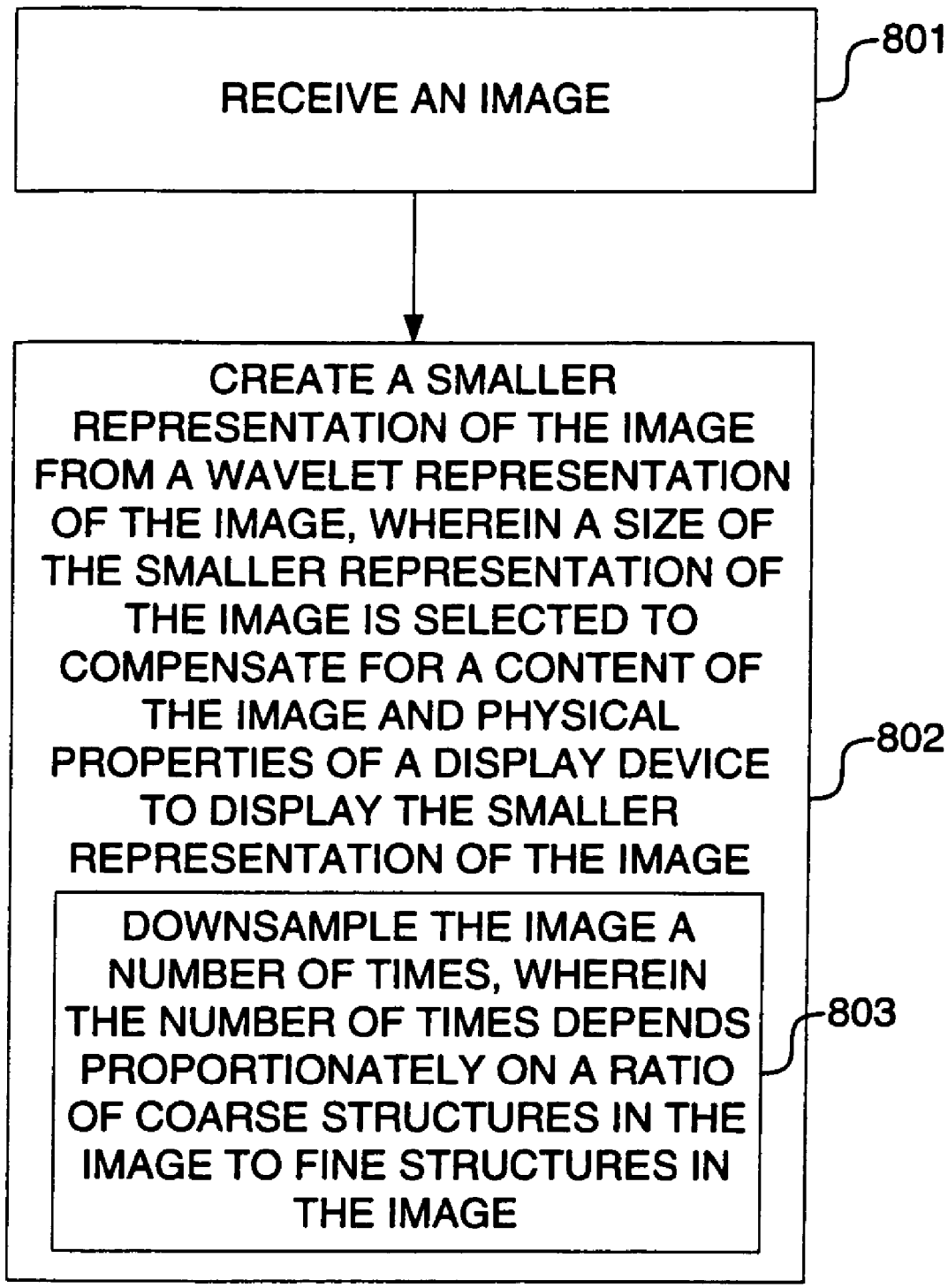
FIG. 8 is a flow diagram of one embodiment of a process for computing an image representation that is visually recognizable when being displayed on a given display device.

FIG. 8 is a flow diagram of one embodiment of a process for computing an image representation that is visually recognizable when being displayed on a given display device. Referring to FIG. 8, processing logic receives an image (processing block 801). Processing logic then creates a smaller representation of the image from a wavelet representation of the image, where the size of the smaller representation of the image is selected based on the content of the image and physical properties of a display device to display the smaller representation of the image (processing block 802). As shown in FIG. 8, as part of creating the smaller representation, processing logic downsamples the image a number of times (processing block 803). The number of times depends proportionately on a ratio of coarse structures in the image to fine structures in the image.

Determination of the Image and Device Dependent Display Scale $L_{Display}$

The display scale $L_{display}$ is computed from the distribution of wavelet coefficients over the device dependent display range $[L_{min}, L_{max}]$. In one embodiment, large coefficients correspond to important edges in the image and small coefficients correspond to unimportant small-scale structures and noise. In one embodiment, a level in the decomposition is determined such that the LL component at that level contains the most important information to allow for visual recognition of the image. Two approaches are described below.

In one embodiment, the best display scale is determined for the entire image from certain resolution levels (i.e., global scale selection). In an alternative embodiment, the image (or its wavelet decomposition) is partitioned into cells and the best display scale for each cell is determined independently (i.e., local scale selection). These approaches are further described below.

Global Scale Selection

In one embodiment, a mathematical formulation for the global scale selection problem is as follows. Consider a wavelet decomposition of an image of size M×N. $W_m^{LL}(X)$ denotes the set of all LL coefficients of the image X at level m. Similarly, $W_m^{HL}(X)$, $W_m^{LH}(X)$, $W_m^{HH}(X)$ denote the set of all wavelet coefficients in the HL, LH and HH bands at level m.

M denotes a measure that reflects the importance of information contained in the low resolution version $X_m = W_m^{LL}(X)$. This importance measure may be defined based on one or more factors, such as, for example, but not limited to, energy, entropy, etc.

The best display level $L_{display}$ is computed by $$L_{display} = \arg\max_{m\in\lambda}\{\mathrm{Cost}(M(W_m^{LL}(X))\}. \quad (5)$$

The actual resulting image is then defined as $W_{Ldisplay}^{LL}(X) = X_{Ldisplay}$.

There are a number of different approaches. Two different approaches include scale selection by maximal energy or entropy and scale selection by two-class labeling.

Scale Selection by Maximal Energy/Entropy

In one embodiment, the display scale is determined by characterizing trends of wavelet coefficients over the levels of resolution and detect levels of trend change. One criterion for a trend is the energy in subbands. If $E_{LH}[m]$ denotes the energy of wavelet coefficients in the subband LH at level m for a text image, then the trend is typically $E_{LH}[L]<E_{LH}[L-1]< \ldots <E_{LH}[1]$. The same trend is valid for the other two subband directions, HL and HH. The trend for a photographic natural image has the opposite behavior, $E_{LH}[L]>E_{LH}[L-1]> \ldots >E_{LH}[1]$. An image that contains mainly text in a small font will follow the text trend for all scales. An image with medium size text will follow the text trend for some large scales $m_1 \ldots L$, and then will switch to the photo trend for the small scales $1 \ldots m_1-1$. Therefore, the smaller scales contain less information than the larger scales and downsampling to scale ml still keeps most of the important information in the image. The display scale is then chosen to be $m_1$. In one embodiment, considering the energy as a function of level E(m), the scale at which the global maximum is located $[L_{min}, L_{max}]$ is determined by $$L_{display} = \arg\max_{m\in[Lmin,Lmax]}(E(m)). \quad (6)$$

In one embodiment, E(m) is the energy of a selected subband (e.g., LH or HL or HH). In an alternative embodiment, E(m) is the energy of a sum of weighted subbands [e.g. $\alpha E_{LH}(m) + \beta E_{HL}(m) + \gamma E_{HH}(m)$. In yet another embodiment, E(m) is the maximum of energy from all subbands (e.g., $\max(E_{LH}(m), E_{HL}(m), E_{HH}(m))$).

For energy, e.g., comparing formula (6) with (5), the importance measure M in Eq. 1 measures the energy of wavelet coefficients at level m and is expressed as $$\mathrm{Cost}(M(W_m^{LL}(X)) = \alpha E(W_m^{HL}(X)) + \beta E(W_m^{LH}(X)) + \gamma E(W_m^{HH}(X)) \text{ or} \quad (7)$$

$$\mathrm{Cost}(M(W_m^{LL}(X)) = \max[E(W_m^{LH}(X)), E(W_m^{LH}(X)), E(W_m^{HH}(X))] \quad (8)$$

In case of entropy M measures entropy H of subbands, $$\mathrm{Cost}(M(W_m^{LL}(X)) = \alpha H(W_m^{HL}(X)) + \beta H(W_m^{LH}(X)) + \gamma H(W_m^{HH}(X)) \text{ or} \quad (9)$$

$$\mathrm{Cost}(M(W_m^{LL}(X)) = \max[H(W_m^{HL}(X)), H(W_m^{LH}(X)), H(W_m^{HH}(X))]. \quad (10)$$

Otherwise computations are the same.

Figure 9:
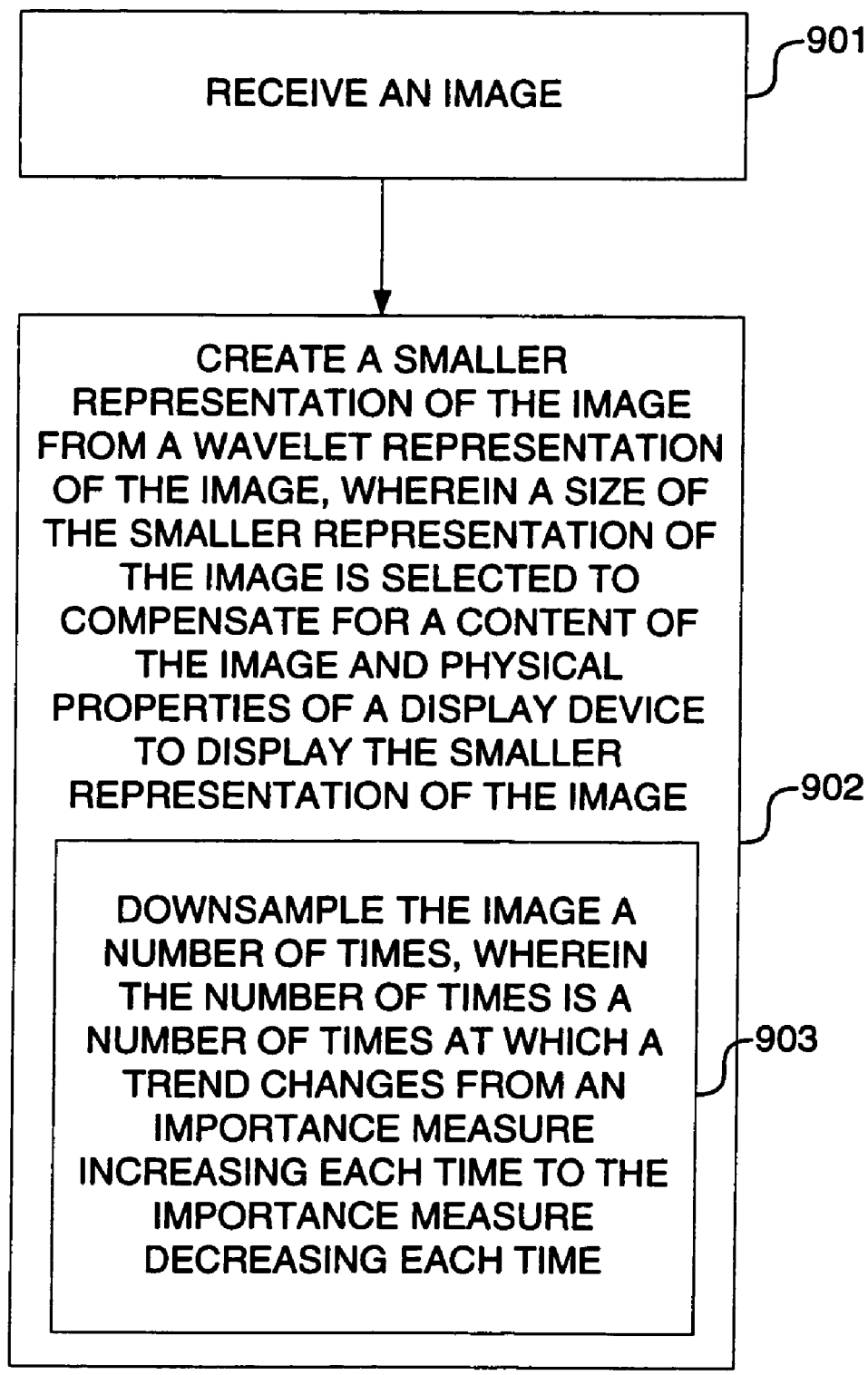
FIG. 9 is a flow diagram of one embodiment of a process for computing an image representation that is visually recognizable when being displayed on a given display device.
Figure 30:
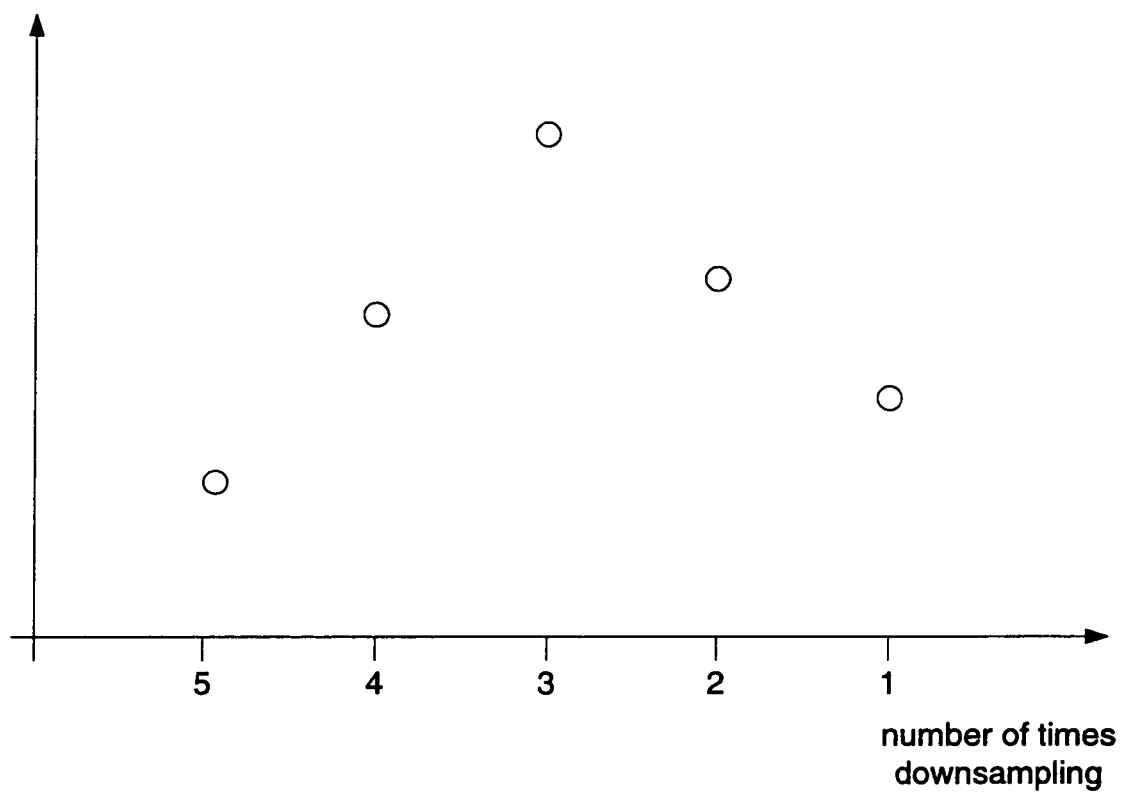
FIG. 30 is a graph illustrating changes in the importance measure over the number of times the image is downsampled.

FIG. 9 is a flow diagram of one embodiment of a process for computing an image representation that is visually recognizable when being displayed on a given display device according to one embodiment. Referring to FIG. 9, processing logic receives an image (processing block 901). Processing logic then creates a smaller representation of the image from a wavelet representation of the image, where the size of the smaller representation of the image is selected based on the content of the image and physical properties of a display device to display the smaller representation of the image (processing block 902). As shown in FIG. 9, as part of creating the smaller representation, processing logic downsamples the image a number of times (processing block 903). The number of times is a number of times at which a trend changes from an importance measure increasing each time to the importance measure decreasing each time, such as shown, for example, in FIG. 30.

Figure 10:
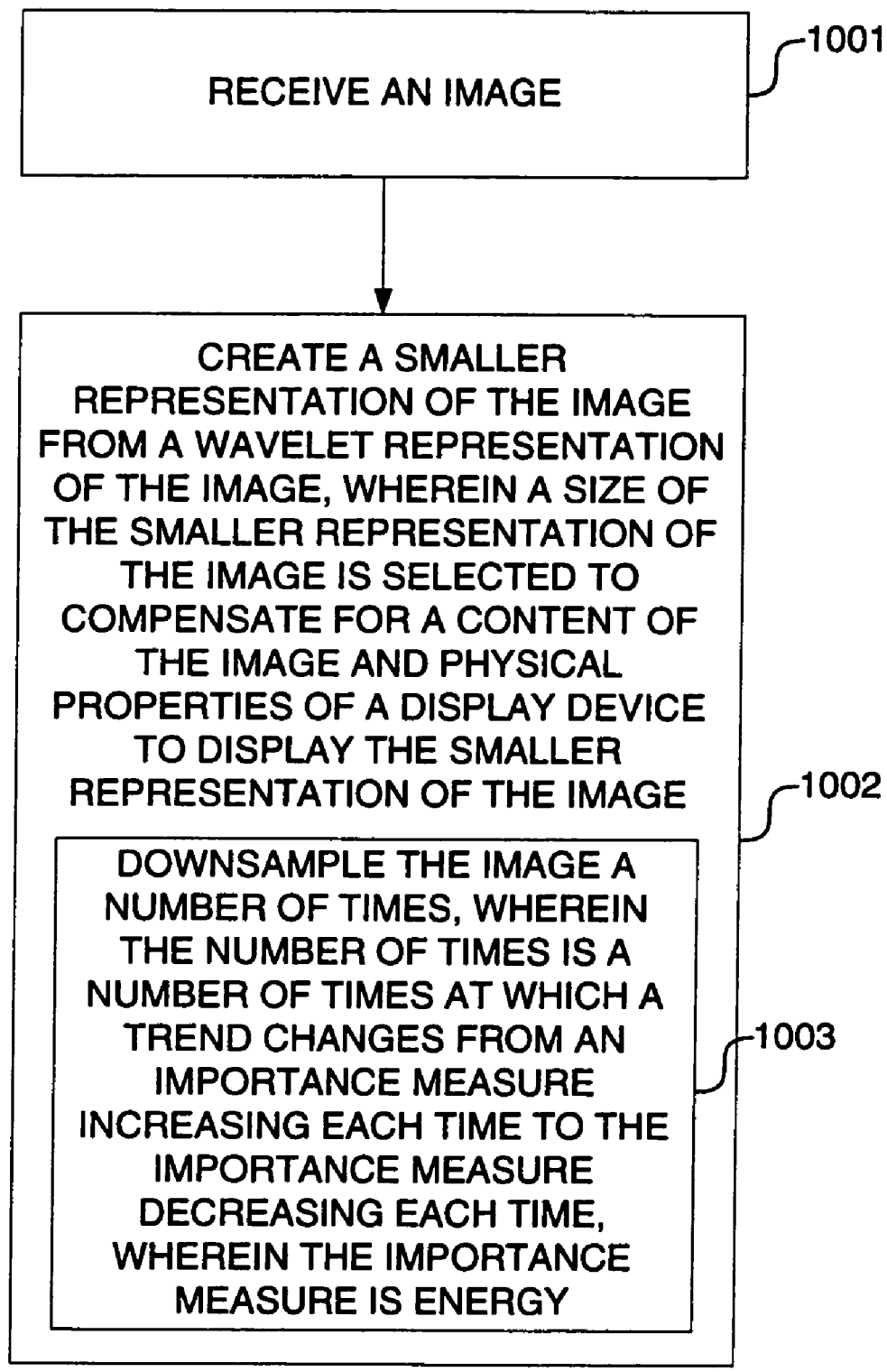
FIG. 10 is a flow diagram of one embodiment of a process for computing an image representation that is visually recognizable when being displayed on a given display device.

FIG. 10 is a flow diagram of one embodiment of a process for computing an image representation that is visually recognizable when being displayed on a given display device. Referring to FIG. 10, processing logic receives an image (processing block 1001). Processing logic then creates a smaller representation of the image from a wavelet representation of the image where, the size of the smaller representation of the image is selected based on the content of the image and physical properties of a display device to display the smaller representation of the image (processing block 1002). As shown in FIG. 10, as part of creating the smaller representation, processing logic downsamples the image a number of times (processing block 1003). The number of times is a number of times at which a trend changes from an importance measure increasing each time to the importance measure decreasing each time, such as shown, for example, in FIG. 30. The importance measure is energy. Therefore, the number of times is a number of times at which a trend changes from an energy increasing each time to the energy decreasing each time.

Figure 11:
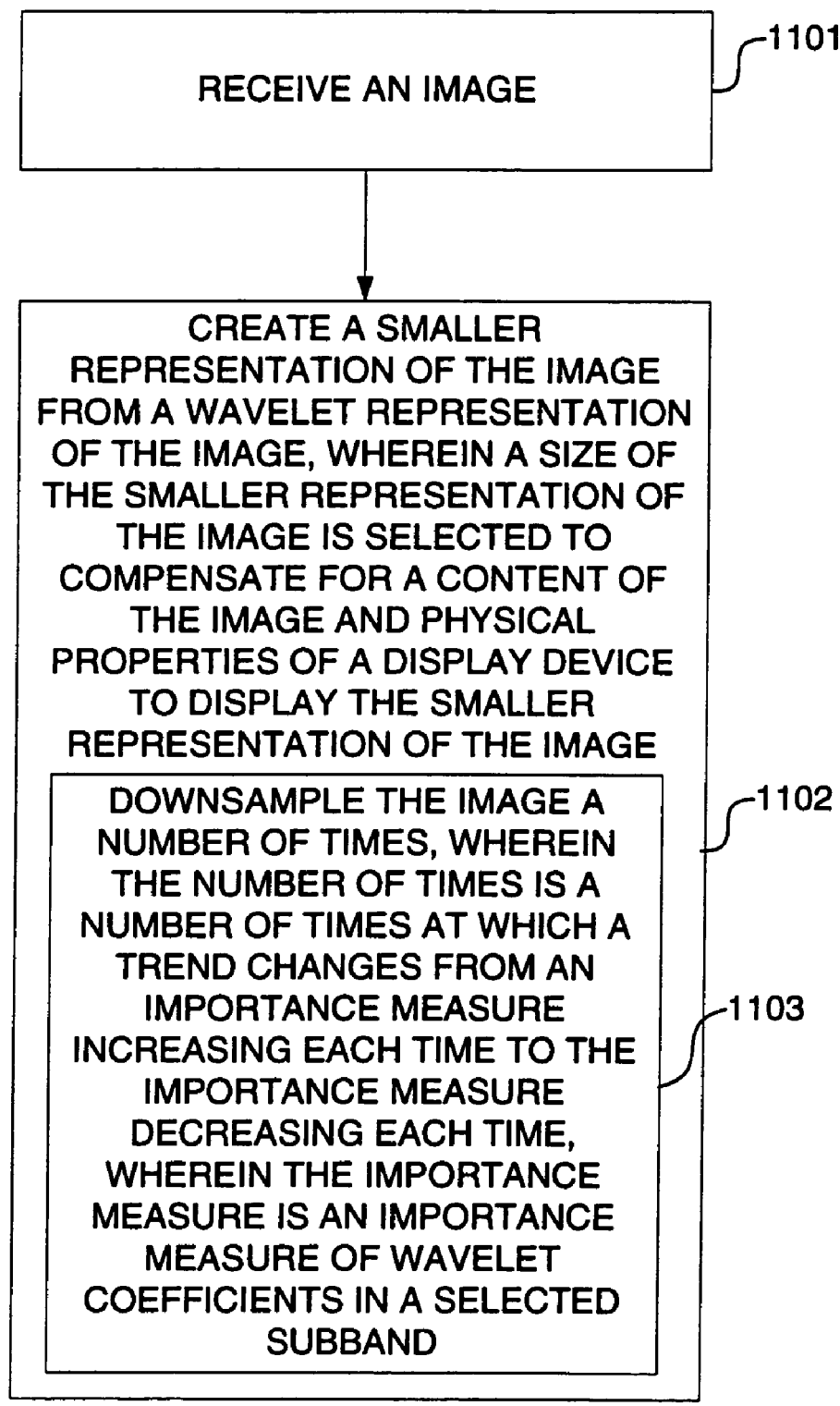
FIG. 11 is a flow diagram of one embodiment of a process for computing an image representation that is visually recognizable when being displayed on a given display device.

FIG. 11 is a flow diagram of one embodiment of a process for computing an image representation that is visually recognizable when being displayed on a given display device. Referring to FIG. 11, processing logic receives an image (processing block 101). Processing logic then creates a smaller representation of the image from a wavelet representation of the image, where the size of the smaller representation of the image is selected based on the content of the image and physical properties of a display device to display the smaller representation of the image (processing block 1102). As shown in FIG. 11, as part of creating the smaller representation, processing logic downsamples the image a number of times (processing block 1103). The number of times is a number of times at which a trend changes from an importance measure increasing each time to the importance measure decreasing each time, such as shown, for example, in FIG. 30. In this case, the importance measure is an importance measure of wavelet coefficients in a selected subband. Therefore, the number of times is a number of times at which a trend changes from an importance measure of wavelet coefficients in a selected subband increasing each time to the importance measure of wavelet coefficients in a selected subband decreasing each time.

Figure 12:
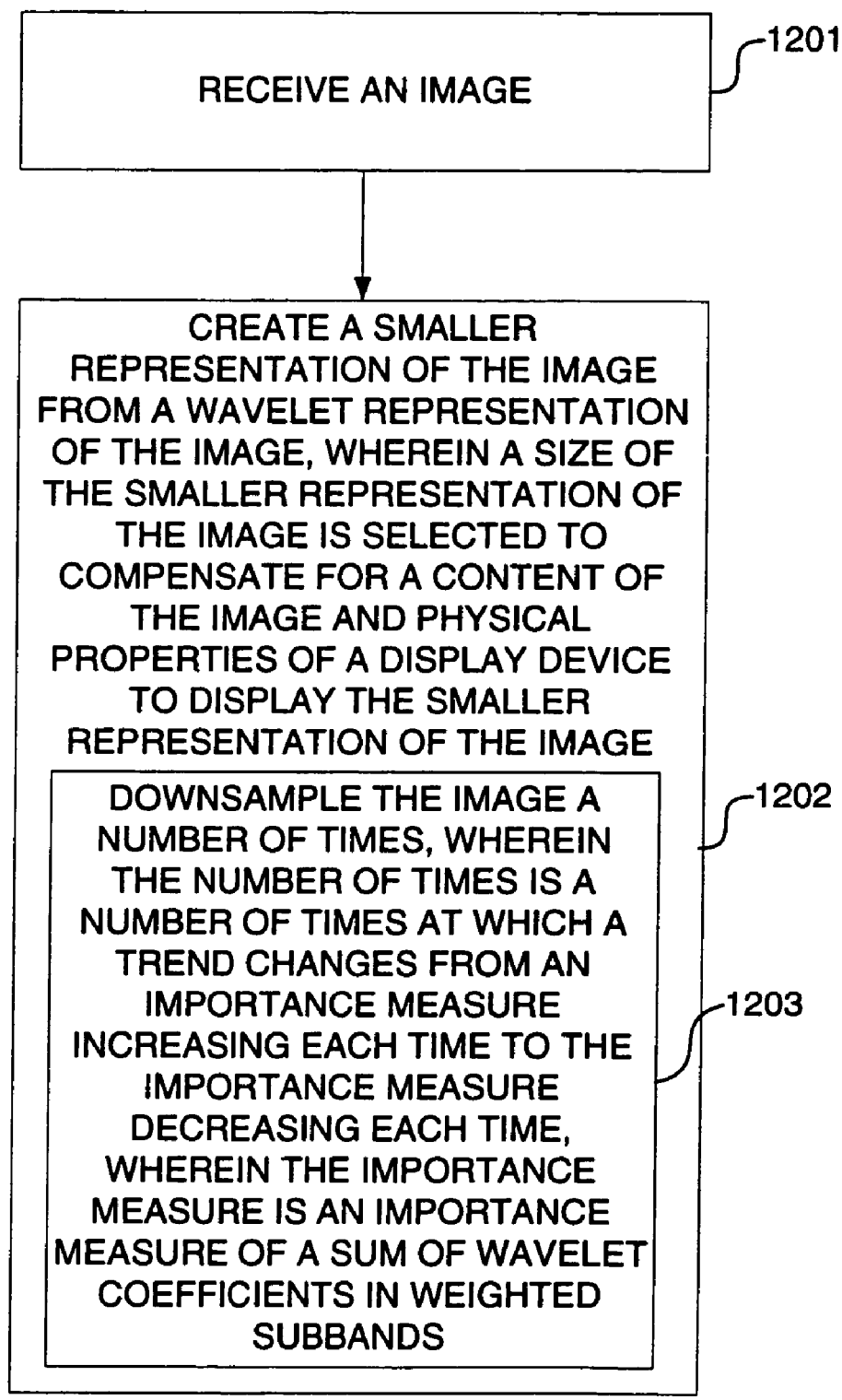
FIG. 12 is a flow diagram of one embodiment of a process for computing an image representation that is visually recognizable when being displayed on a given display device.

FIG. 12 is a flow diagram of one embodiment of a process for computing an image representation that is visually recognizable when being displayed on a given display device. Referring to FIG. 12, processing logic receives an image (processing block 1201). Processing logic then creates a smaller representation of the image from a wavelet representation of the image, where the size of the smaller representation of the image is selected based on the content of the image and physical properties of a display device to display the smaller representation of the image (processing block 1202). As shown in FIG. 4, as part of creating the smaller representation, processing logic downsamples the image a number of times (processing block 1203). The number of times is a number of times at which a trend changes from an importance measure increasing each time to the importance measure decreasing each time, such as shown, for example, in FIG. 30. In this case, the importance measure is an importance measure of a sum of wavelet coefficients in weighted subbands. Therefore, the number of times is a number of times at which a trend changes from an importance measure of a sum of wavelet coefficients in weighted subbands increasing each time to the importance measure of a sum of wavelet coefficients in weighted subbands decreasing each time.

Figure 13:
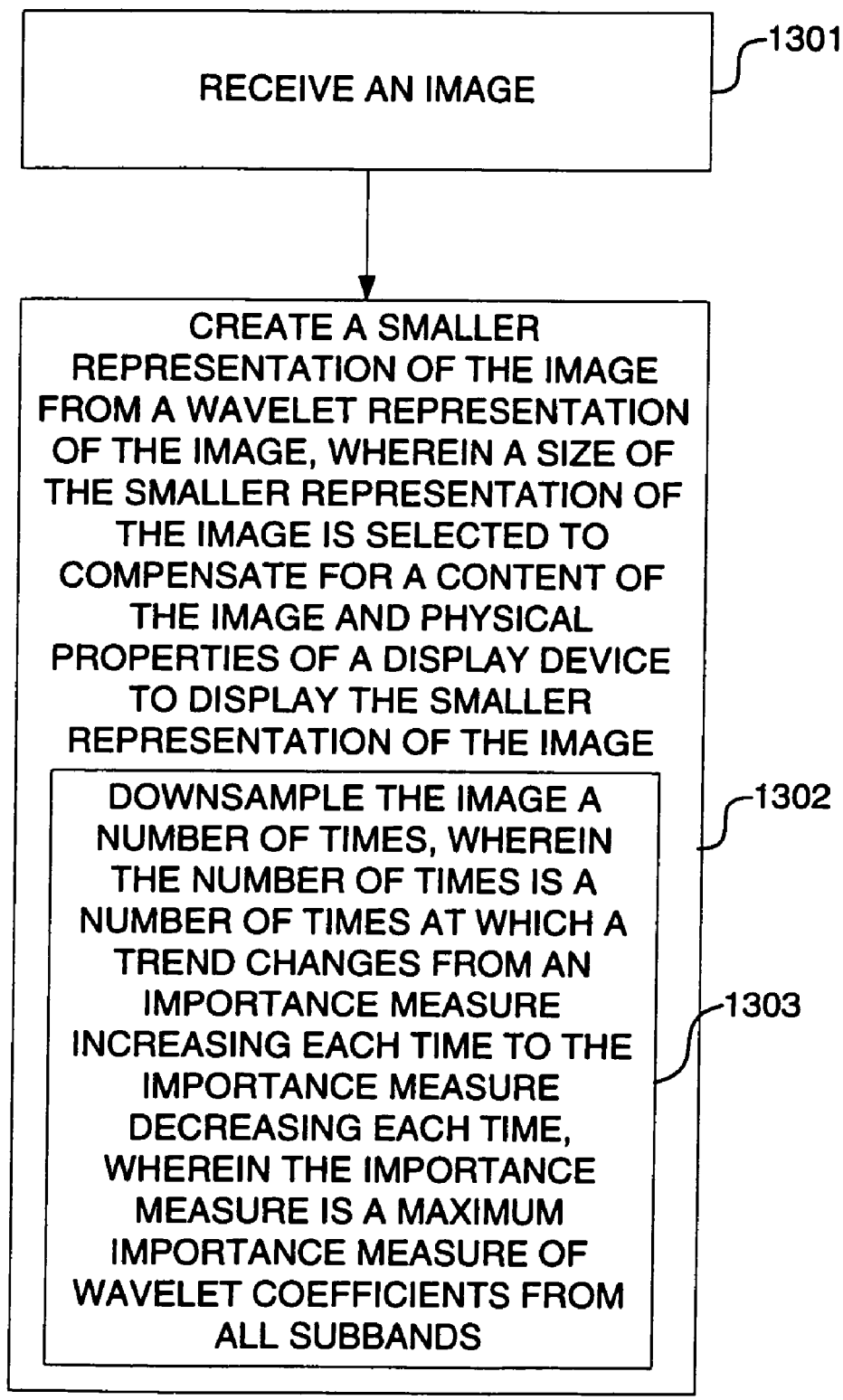
FIG. 13 is a flow diagram of one embodiment of a process for computing an image representation that is visually recognizable when being displayed on a given display device.

FIG. 13 is a flow diagram of one embodiment of a process for computing an image representation that is visually recognizable when being displayed on a given display device. Referring to FIG. 13, processing logic receives an image (processing block 1301). Processing logic then creates a smaller representation of the image from a wavelet representation of the image where the size of the smaller representation of the image is selected based on the content of the image and physical properties of a display device to display the smaller representation of the image (processing block 1302). As shown in FIG. 4, as part of creating the smaller representation, processing logic downsamples the image a number of times (processing block 1303). The number of times is the times at which a trend changes from an importance measure increasing each time to the importance measure decreasing each time, such as shown, for example, in FIG. 30. In this case, the importance measure is a maximum importance measure of wavelet coefficients from all subbands. Therefore, the number of times is the times at which a trend changes from a maximum importance measure of wavelet coefficients from all subbands increasing each time to the maximum importance measure of wavelet coefficients from all subbands decreasing each time.

In images that contain a lot of noise, the determination of $L_{display}$ could result in a scale containing mostly noise. Therefore, an additional criterion for distinguishing between noise and the image is useful to eliminate this case. In one embodiment, noise is removed from the wavelet coefficients using wavelet denoising. One denoising technique that may be used for this is described in Donoho, D. L., "Denoising by soft-thresholding," IEEE Transactions on Information Theory, vol. 41, no. 3, pp. 613-627, 1995). Alternatively, another technique that may be used is described in U.S. patent application Ser. No. 10/044,420, entitled "Header-Based Processing Of Images Compressed Using Multi-Scale Transforms", concurrently filed Jan. 10, 2002, and assigned to the corporate assignee of the present invention. In one embodiment, after denoising, the determination of the display scale is performed as set forth in Eq. (6) above.

Figure 14:
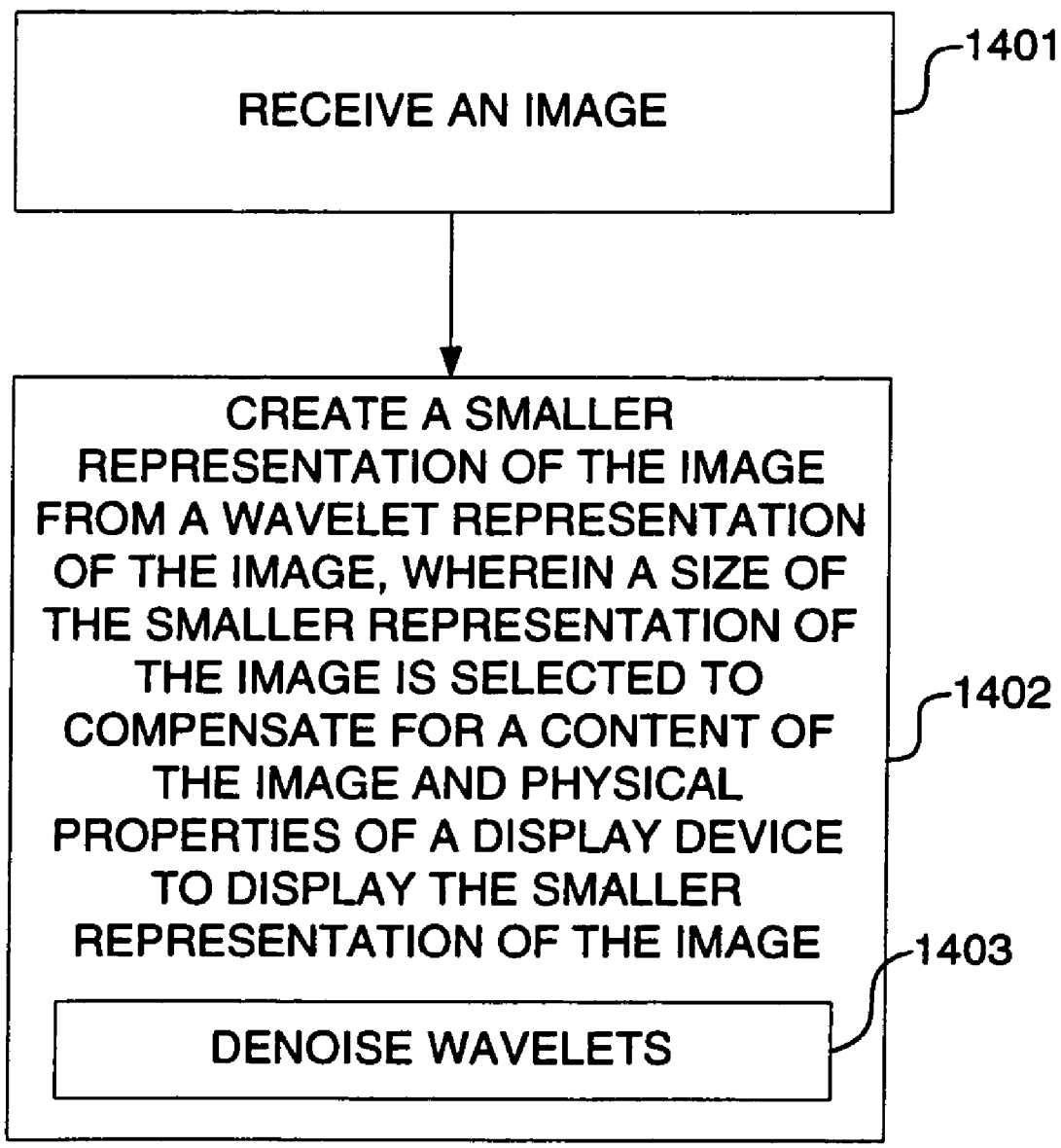
FIG. 14 is a flow diagram of one embodiment of a process for computing an image representation that is visually recognizable when being displayed on a given display device.

FIG. 14 is a flow diagram of one embodiment of a process for computing an image representation that is visually recognizable when being displayed on a given display device. Referring to FIG. 14, processing logic receives an image (processing block 1401). Processing logic then creates a smaller representation of the image from a wavelet representation of the image, where the size of the smaller representation of the image is selected based on the content of the image and physical properties of a display device to display the smaller representation of the image (processing block 1402). As shown in FIG. 14, as part of creating the smaller representation, processing logic denoises wavelet coefficients (processing block 1403).

In an alternative embodiment, in order to lower computational complexity, wavelet coefficients are not considered at all possible scales (levels) simultaneously, but are considered starting with the coarsest scale first, incorporating the next finer scales one by one and checking after incorporating each finer level whether a display scale $L_{display}$ can be determined. One embodiment of such an approach is described below.

In one approach, processing logic determines the energy as a function of level E(m). For increasing m, as long as $E(m-1) \leq E(m)$, processing logic computes E(m+1). If $m = L_{min}$, then processing logic sets $L_{display} = L_{min}$.

If $E(m-1) > E(m)$, then processing level neglects level m as the possible display scale $L_{display}$ if the ratio of error between denoised and original coefficients in one or more subbands at level m−1 and the original coefficients is larger than a predetermined threshold. For example, in one embodiment, the predetermined threshold is 0.7. Otherwise, processing logic chooses $L_{display} = m-1$.

Figure 15:
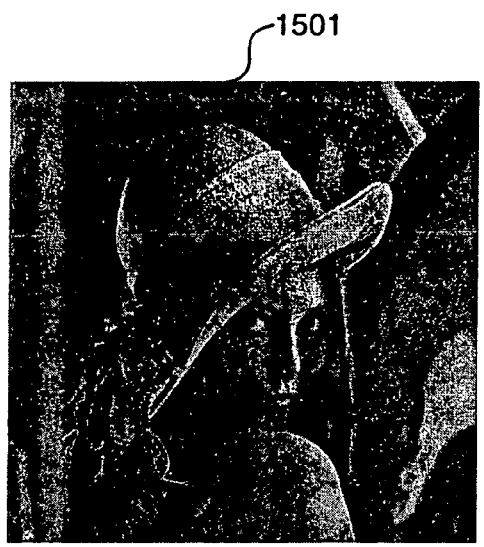
FIG. 15 is a flow diagram showing results of an approach for computing an image representation that is visually recognizable when being displayed on a given display device for two example images.
Figure 15:

FIG. 15 illustrates results of an approach for computing an image representation that is visually recognizable when being displayed on a given display device for two example images.

In an alternative embodiment, instead of determining the trend based on the importance measure energy, the importance measure entropy could be used. The entropy determines how many bits are spent to encode coefficients. The display scale is determined in a similar fashion as described in Eq. (8) by substituting entropy for energy of coefficients at level m.

Figure 16:
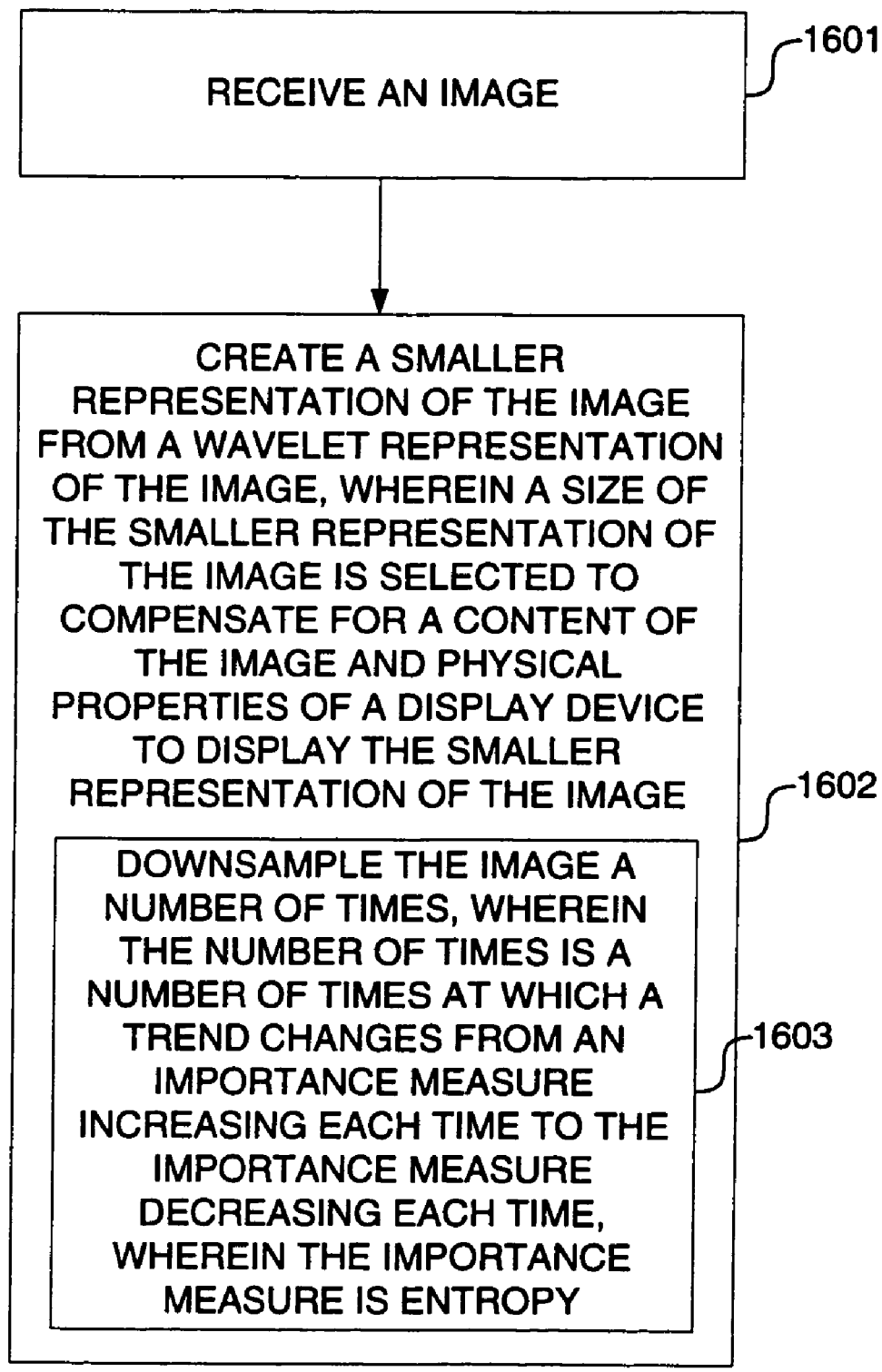
FIG. 16 is a flow diagram of one embodiment of a process for computing an image representation that is visually recognizable when being displayed on a given display device.

FIG. 16 is a flow diagram of one embodiment of a process for computing an image representation that is visually recognizable when being displayed on a given display device. Referring to FIG. 16, processing logic receives an image (processing block 1601). Processing logic then creates a smaller representation of the image from a wavelet representation of the image where the size of the smaller representation of the image is selected based on the content of the image and physical properties of a display device to display the smaller representation of the image (processing block 1602). As shown in FIG. 16, as part of creating the smaller representation, processing logic downsamples the image a number of times (processing block 1603). The number of times is a number of times at which a trend changes from an importance measure increasing each time to the importance measure decreasing each time where the importance measure is entopy. Therefore, the number of times is a number of times at which a trend changes from entropy increasing each time to entropy decreasing each time.

In one embodiment, some alternatives for energy include sum of entropy in all subbands, using the maximum energy, and using linear combination, such as described above.

Scale Selection by Maximal Significance Ratio

In an alternative embodiment, a different criterion than that of Eq. (6) is used to determine a display scale. This criteria is based on a two-class labeling in which all wavelet coefficients are segregated into classes of significant and insignificant coefficients and then the scale that has the highest ratio of significant to insignificant coefficients is determined such that $$L_{display} = \arg\max_{m=Lmin,\ldots,Lmax}(\mu(\text{significant coefficients})/\mu(\text{insignificant coefficients})) \quad (12)$$

where μ measures a class of data. In one embodiment, this measure is a count of data points in the class. In an alternative embodiment, this measure is a weighted counting (e.g., weighting the center of the image more).

In two-class labeling, M measures percentage of significant wavelet coefficients at level m. The significance can be determined by checking whether a coefficient has magnitude larger than a predefined threshold or not. Another method would be to incorporate information from scales larger than m in the decision. One example is to check whether a coefficient is larger than a given percentage of the energy of coefficients at the next larger scale. The percentage threshold could depend on the display device or the application. Another example is to estimate a local entropy for each coefficient and check whether that value is larger than a given percentage of the entropy of coefficients at the next larger scale.

In one embodiment, the cost function in Eq. 1 is as follows:

$\text{Cost}(M(W_m^{LL}(X)))=0$ if percentage of significant coefficients at level m is smaller than a given threshold T, or given that percentage of significant coefficients at level $n \geq m$ is smaller than T.

$\text{Cost}(M(W_m^{LL}(X)))$=percentage of significant coefficients at level m if that is larger or equal than a given threshold T, given that percentage of significant coefficients at level $n \geq m$ is larger than T.

Figure 17:
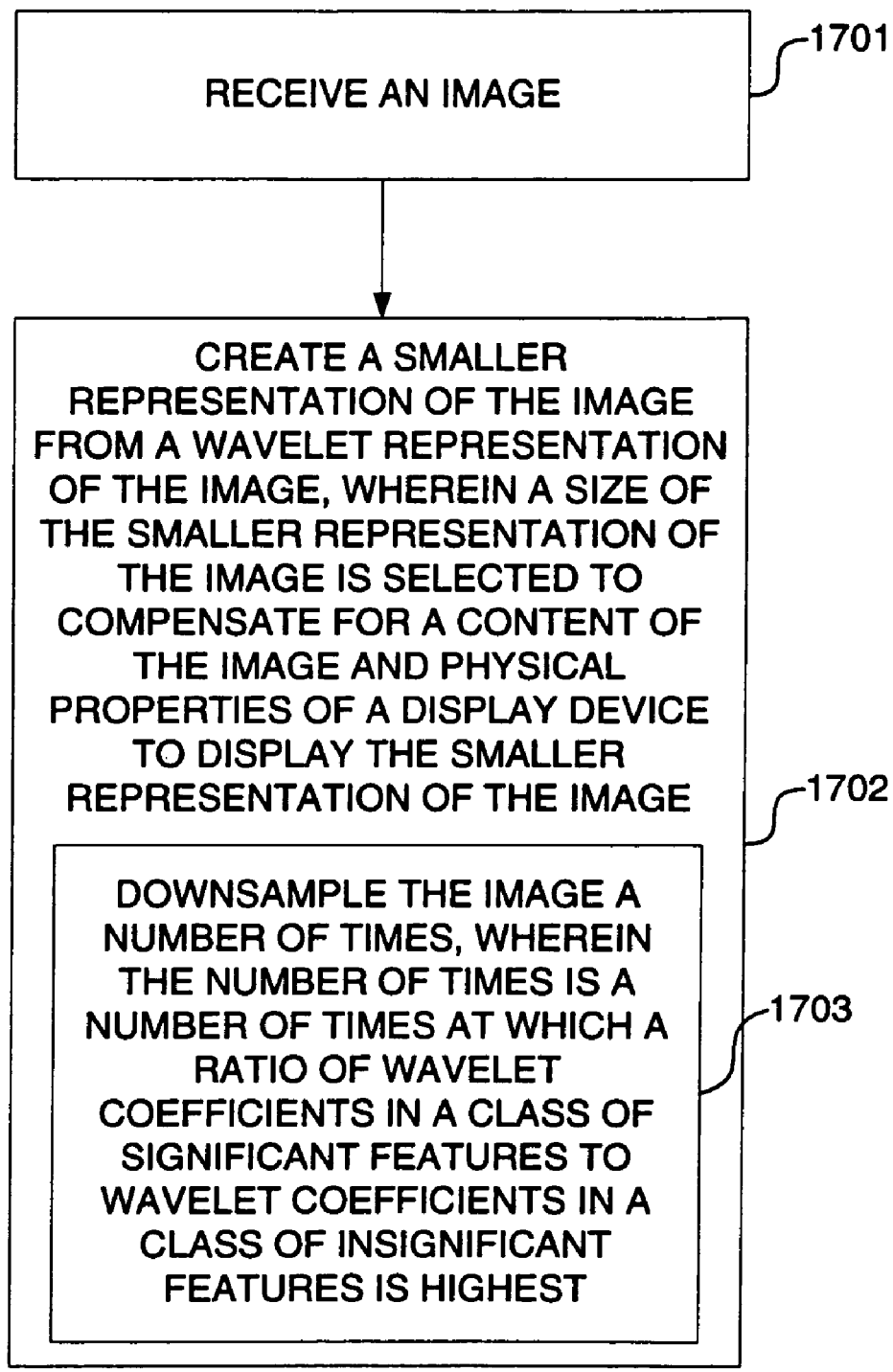
FIG. 17 is a flow diagram of one embodiment of a process for computing an image representation that is visually recognizable when being displayed on a given display device.

FIG. 17 is a flow diagram of one embodiment of a process for computing an image representation that is visually recognizable when being displayed on a given display device. Referring to FIG. 17, processing logic receives an image (processing block 1701). Processing logic then creates a smaller representation of the image from a wavelet representation of the image, where the size of the smaller representation of the image is selected based on the content of the image and physical properties of a display device to display the smaller representation of the image (processing block 1702). As shown in FIG. 17, as part of creating the smaller representation, processing logic downsamples the image a number of times (processing logic 1703). The number of times is a number of times at which a ratio of wavelet coefficients in a class of significant coefficients to coefficients in a class of insignificant coefficients is highest.

Approaches to solving the two-class labeling problem are well known in the field of pattern recognition. For example, see Duda, R. O., Hart, P. E., and Stork, D. G., *Pattern Classification* ($2^{nd}$ ed.), Wiley, New York, 2000. The two-class labeling problem for each scale solved may be solved using Bayesian decision theory. Image data that can enter into the probability models are magnitude of coefficients or local entropies.

Local Scale Selection

Local scale selection needs a partition in the image or wavelet domain and needs to consider groupings of coefficients or pixels. The grouping can be either given by the application or the user or is determined from the image data.

Partition of Image Domain into Segments

In one embodiment, the image is divided into two dimensional segments (e.g., tiles in J2K) and then global scale selection is performed as described below.

In one embodiment, instead of selecting a display scale and then choosing the LL component at that scale as the image representation, a part of the image at a specific scale (e.g., text at fine scale, background at coarse scale) is selected. In order to perform such a local scale selection, the image is partitioned into segments. In one embodiment, the segments are individual coefficients. In an alternative embodiment, the segments are cover groups of coefficients, shaped like, for example, squares, rectangles, etc.

After a partition (given, e.g., by the segment size and shape size) is chosen, the same approach on global scale selection as described above is applied to each of the segments S of the partition. As a result, each S(i) has an assigned display scale $L_{display}(i)$. In terms of pattern recognition, the result is an ($L_{max} - L_{min}$)-class labeling of the segment.

Figure 18A:
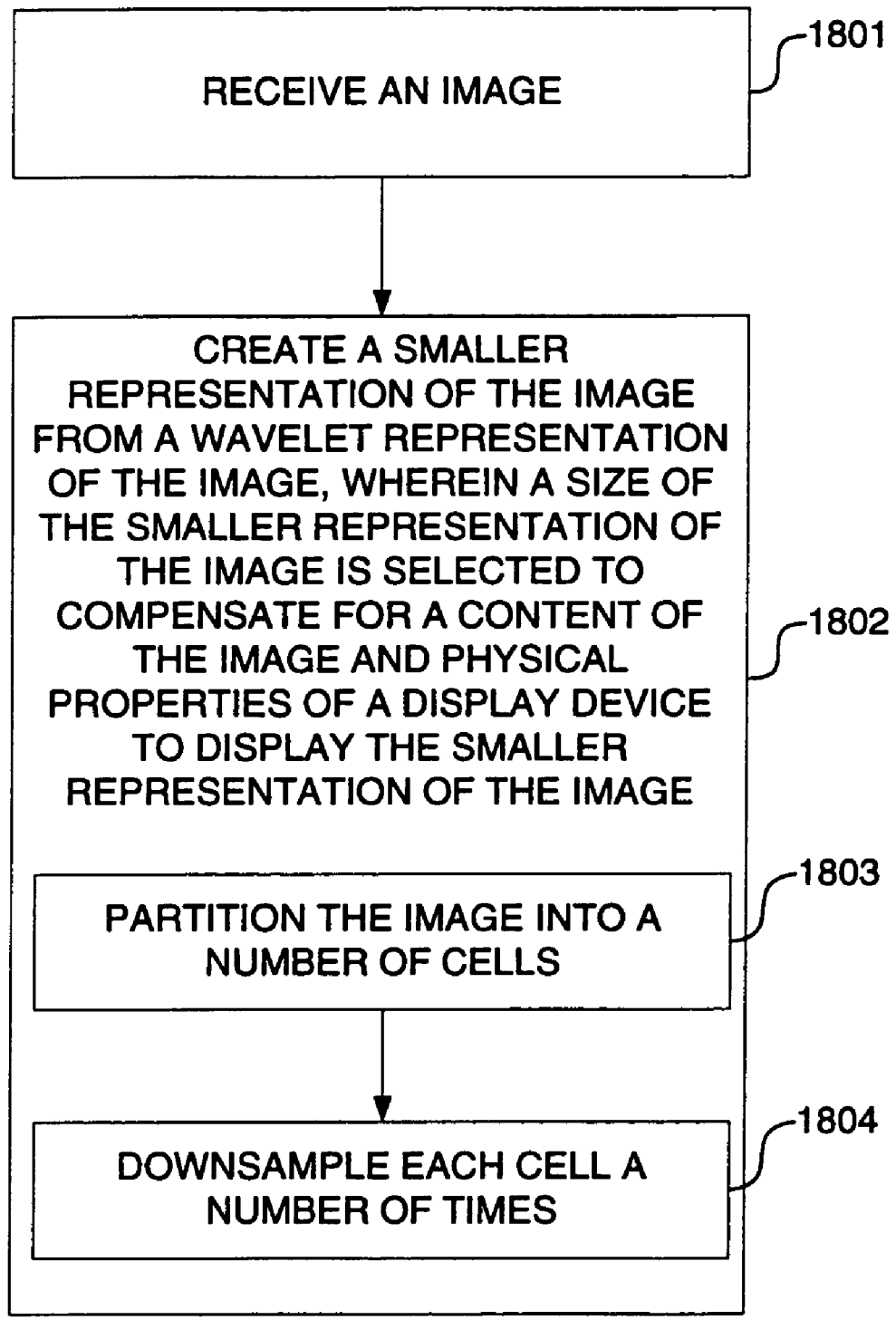
FIG. 18 is a flow diagram of one embodiment of a process for computing an image representation that is visually recognizable when being displayed on a given display device.
Figure 18B:
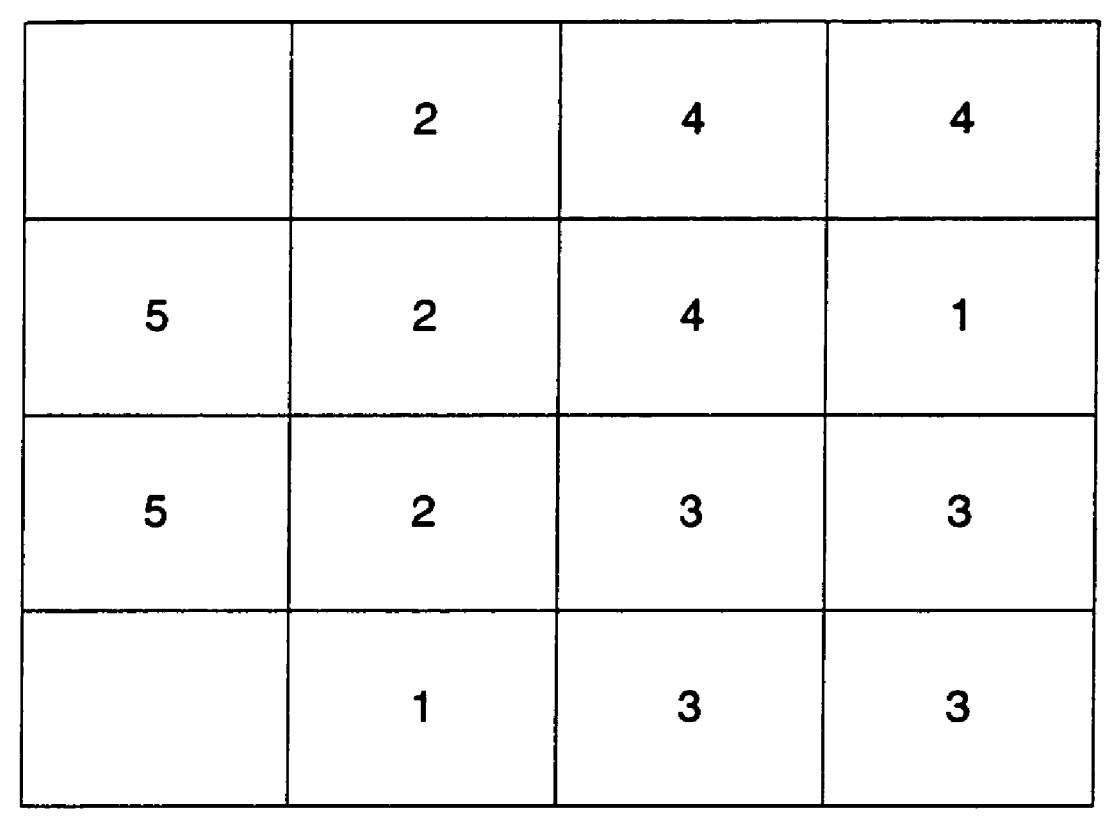

FIG. 18 is a flow diagram of one embodiment of a process for computing an image representation that is visually recognizable when being displayed on a given display device. Referring to FIG. 18, processing logic receives an image (processing block 1801). Processing logic then creates a smaller representation of the image from a wavelet representation of the image, where the size of the smaller representation of the image is selected based on the content of the image and physical properties of a display device to display the smaller representation of the image (processing block 1802). As part of the creation process, processing logic partitions the image into segments (processing block 803). Processing logic then downsamples each segment a number of times (processing block 1804). Downsampling a cell is performed in the same manner as is downsampling an image.

In one embodiment, only parts (e.g., segments) of the image that are associated with a particular display scale (e.g., $L_{display}=2$) are displayed. The selected segments may be grouped or embedded into connected components. For example, for most image displays a rectangular display of image information is preferred because most image displays are rectangular. There are many approaches to selecting rectangles depending on an m-class labeling result. In one embodiment, the largest bounding box that contains all segments with $L_{display}=2$ is chosen. The disadvantage of this embodiment is that isolated outliers for the box might be very large. According to an alternative embodiment, an approach that avoids this effect is used by choosing the rectangle such that the ratio $$R(2)=\mu(\text{segments in rectangle with } L_{display}=2)/\mu(\text{segments in rectangle with } L_{display} \neq 2) \quad (13)$$

is maximized, where $\mu$ denotes a measure as in Eq. (12). An example of one such rectangle is given in FIG. 10B. In an alternative embodiment, an approach is used that selects the rectangle that maximizes $$R(m)=\mu(\text{segments in rectangle with } L_{display}=m)/m \text{ (segments in rectangle with } L_{display} \neq m) \quad (14)$$

over all $m \in \lambda$.

Differently stated, ($L_{max} - L_{min}$)-class labeling problems combining global and local scale selections lead to design choices for reduced images in specific applications that are discussed in further detail below.

Partition of Wavelet Domain into Cells

When partitioning the wavelet domain into cells, the wavelet domain is divided into wavelet cells. The metric M(x) measures information content for a group of data points a low-resolution $X_m$.

Let $x \in X_m$. The information content of x is computed by M(x) from measuring the contribution of energy or entropy of all the wavelet cells level larger or equal M that include x in their support at resolution level m. The energy or entropy may be scaled depending on the resolution of the wavelet cell and its size. The cost function sums over the measured information content of all data points that fit into a predescribed shape (e.g., a rectangle) or a given size. By choosing those points that produce the largest output of the cost function a part of the original image at a specific resolution is chosen for a reduced size image with recognizable information.

Figure 19:
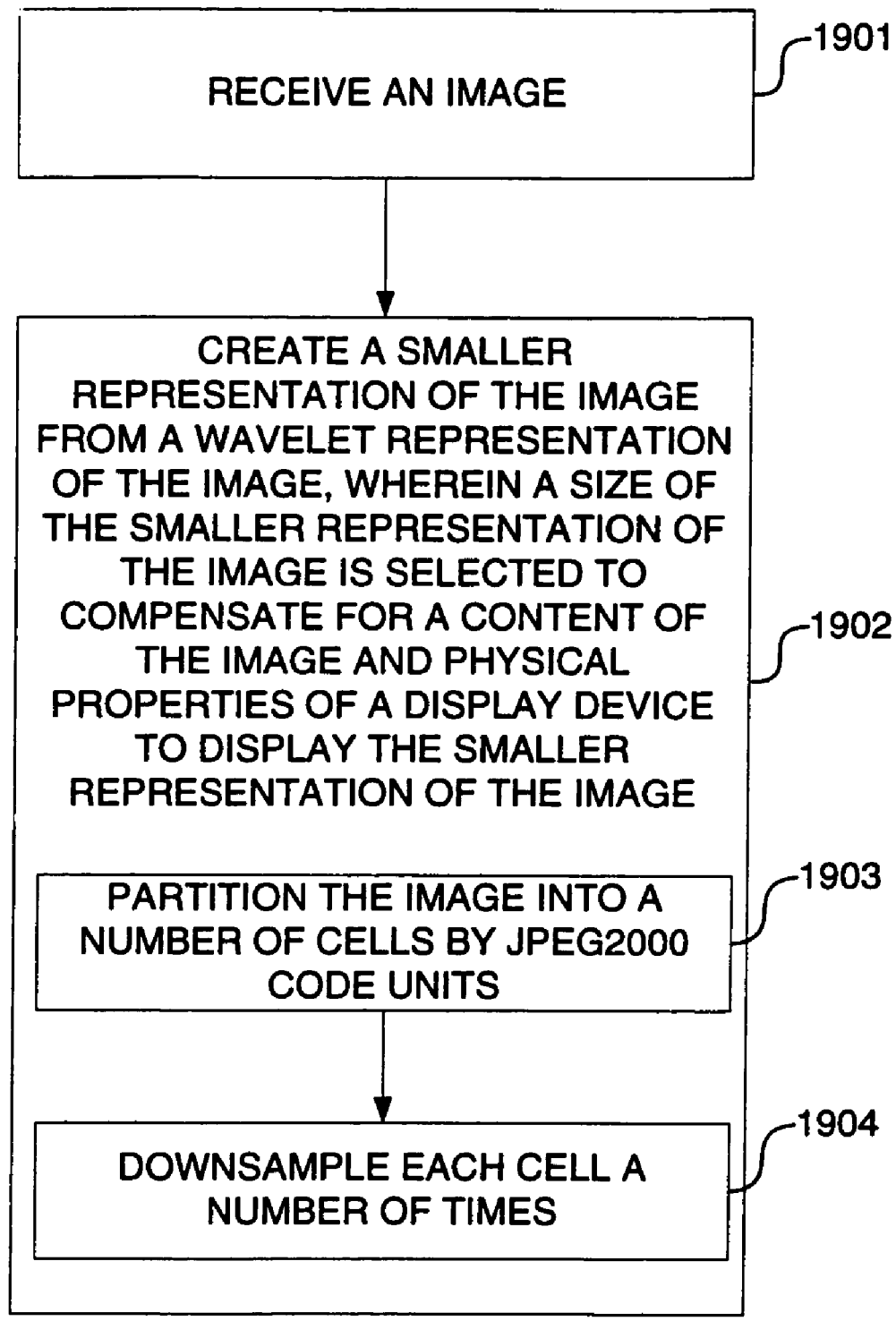
FIG. 19 is a flow diagram of one embodiment of a process for computing an image representation that is visually recognizable when being displayed on a given device.

FIG. 19 is a flow diagram of one embodiment of a process for computing an image representation that is visually recognizable when being displayed on a given display device. Referring to FIG. 19, processing logic receives an image (processing block 1901). Processing logic then creates a smaller representation of the image from a wavelet representation of the image, where the size of the smaller representation of the image is selected based on the content of the image and physical properties of a display device to display the smaller representation of the image (processing block 1902). As part of the creation process, processing logic partitions the image into cells using, for example, JPEG2000 code units (processing block 1903). Thereafter, processing logic displays image content described by coefficients in selected cells, where cells are selected through a segmentation algorithm. For more information see co-pending U.S. patent application Ser. No. 10/044,420, entitled Header-Based Processing Of Images Compressed Using Multi-Scale Transforms, concurrently filed on Jan. 10, 2002, and assigned to the corporate assignee of the present invention.

Figure 20:
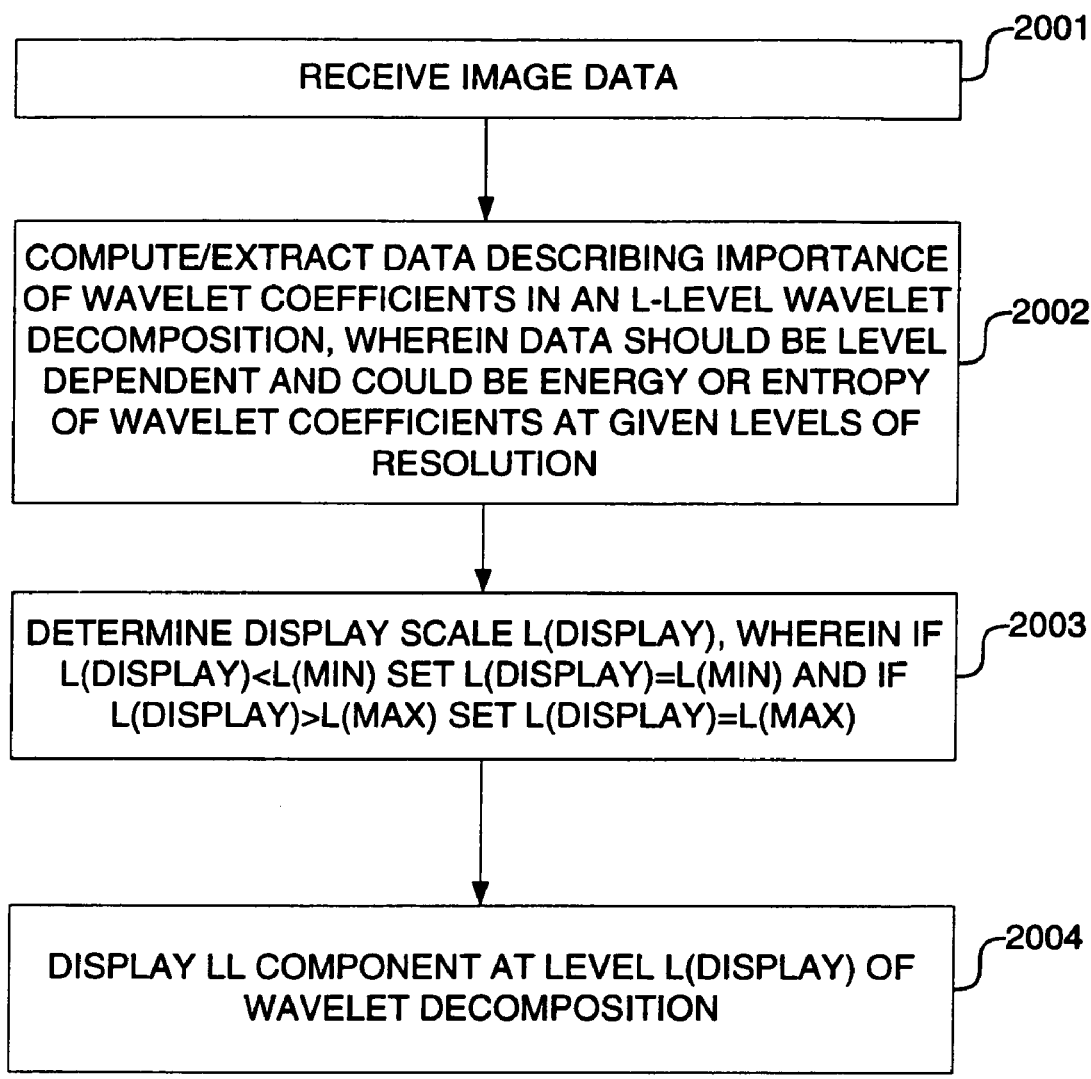
FIG. 20 is a flow diagram of one embodiment of a process for image creation based on global scale selection.

FIG. 20 is a flow diagram of one embodiment of a process for creating a reduced size image based on global scale selection. In process block 2001, image data is received. In process block 2002, data describing the importance of wavelet coefficients in an L-level wavelet decomposition is computed/extracted. The data should be level dependent and could be the energy or entropy of wavelet coefficients at given levels of resolution. In process block 2003, the display scale $L_{display}$ is determined. If $L_{display} < L_{min}$ then $L_{display}$ is set to equal $L_{min}$. If $L_{display} > L_{max}$ then $L_{display}$ is set to equal $L_{max}$. Finally, in process block 2004, the LL component at level $L_{display}$ of wavelet decomposition is displayed.

Figure 21:
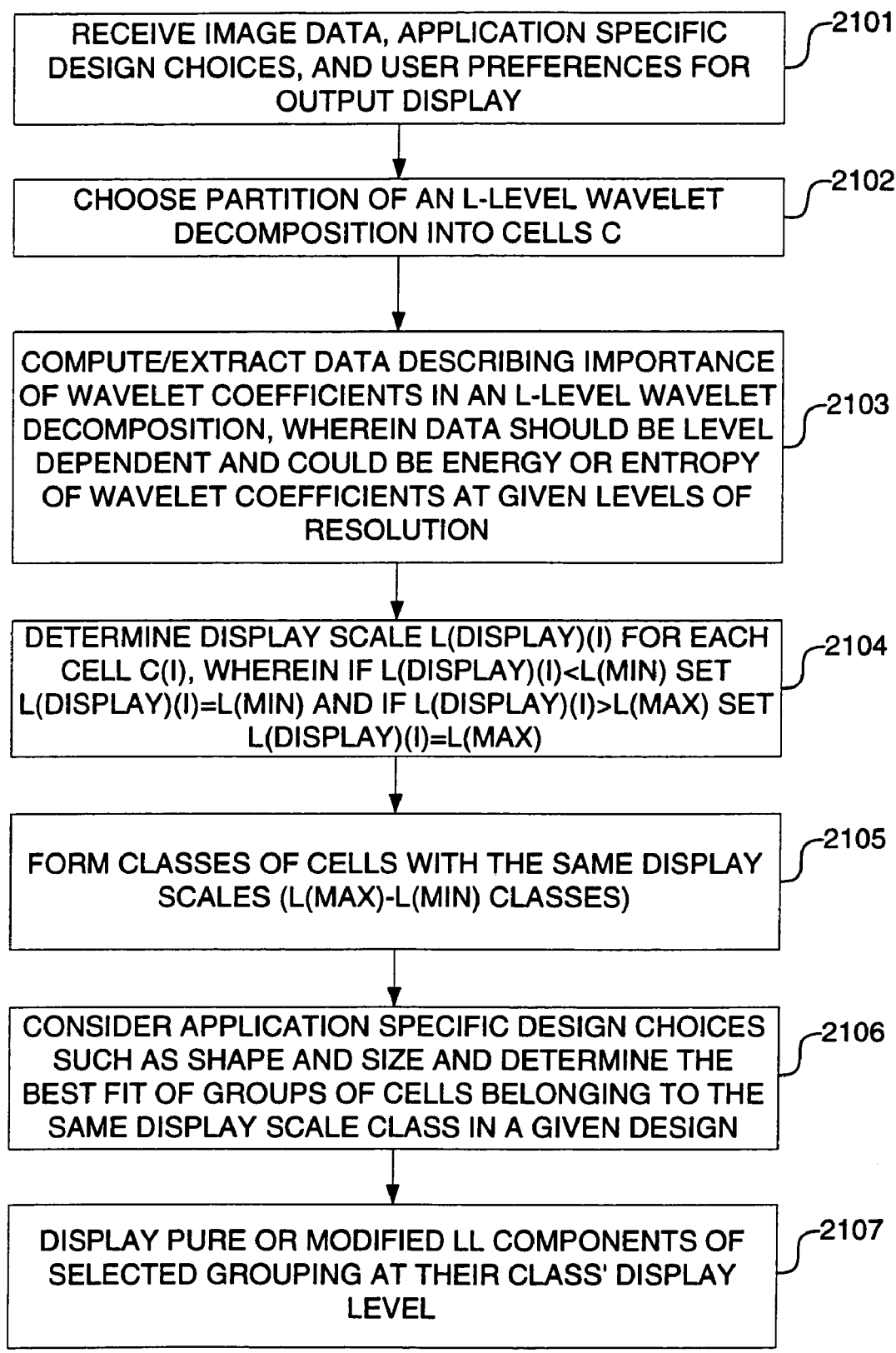
FIG. 21 is a flow diagram of one embodiment of a process for image creation based on local scale selection.

FIG. 21 is a flow diagram of one embodiment of a process for creating a reduced size image based on local scale selection. In process block 2101, image data, application specific design choices, and user preferences for output display are received. In process block 2102, a partition of an L-level wavelet decomposition into cells C is chosen. In process block 2103, data describing the importance of wavelet coefficients in an L-level wavelet decomposition is computed/extracted. The data should be level dependent and could be the energy or entropy of wavelet coefficients at given levels of resolution. In process block 2104, the display scale $L_{display}(i)$ is determined for each cell C(i). If $L_{display}(i) < L_{min}$ then $L_{display}(i)$ is set to equal to $L_{min}$. If $L_{display}(i) > L_{max}$ then $L_{display}(i)$ is set to equal $L_{max}$. In process block 2105, classes of cells with the same display scales ($L_{min}$–$L_{max}$ classes) are formed. In process block 2106, application specific design choices such as shape and size are considered and the best fit of groups of cells belonging to the same display scale class in a given design in determined. Finally, in process block 2107, pure or modified LL components of selected grouping at their class' display level are displayed.

Figure 22:
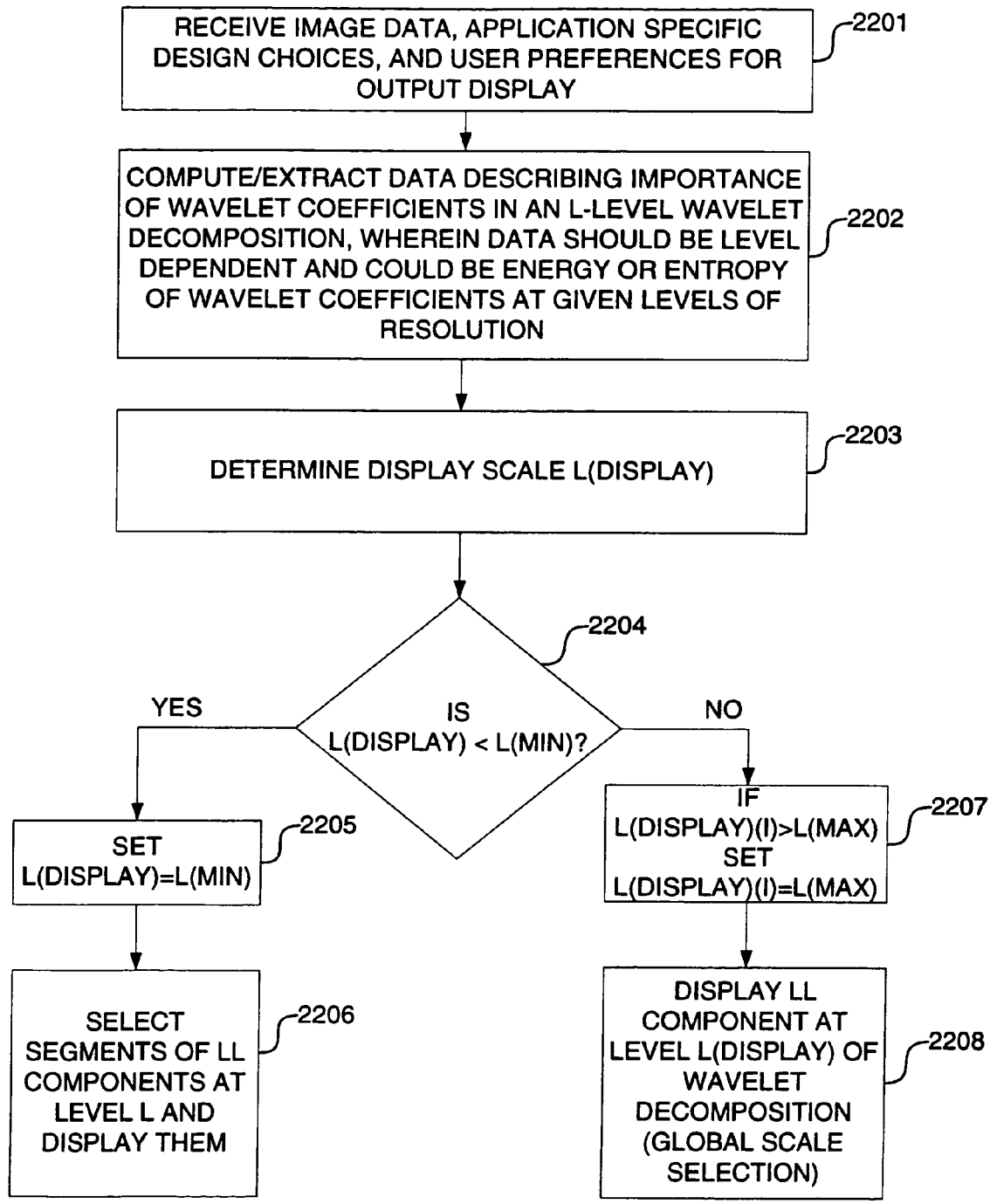
FIG. 22 is a flow diagram of one embodiment of a process for image creation based on a combination of global and local scale selection.

FIG. 22 is a flow diagram of one embodiment of a process for creating a reduced size image based on a combination of global and local scale selection. In process block 2201, image data, application specific design choices, and user preferences for output display are received. In process block 2102, data describing the importance of wavelet coefficients in an L-LEVEL wavelet decomposition is computed/extracted. The data should be level and cell dependent and could be the energy or entropy of wavelet coefficients at given levels of resolution. In process block 2203, display scale $L_{DISPLAY}$ is determined. If $L_{DISPLAY} \notin [L_{MIN}, L_{MAX}]$ in decision diamond 2204, then process block 2205 performs local scale selection on the image such that selected LL components have display level L∉[0, L(MAX)] and fit into display pixel size or fixed size and shape. Otherwise, in process block 2207, the LL component at level $L_{DISPLAY}$ of wavelet decomposition is displayed (i.e., global scale decomposition).

As an extension the maximization could be computed over a pre-described shape, but variable size or flexible shape of fixed size or flexible shapes of variable size.

Below is a mathematical formulation of the above.

A partition P of a set X is a set of subsets of X such that $$P = \bigcup_{p \in P} p$$

and $p_1 \cap p_2 = 0$ for $p_1 \neq p_2$ and every pair of sets $p_1, p_2 \in P$.

$$I_m^{HL} = \{(i,j) | i=0, \ldots M2^{-m}-1, j=N2^{-m}, \ldots N2^{-2m}-1\} \quad (15)$$

$$I_m^{LH} = \{(i,j) | i=M2^{-m}, \ldots M2^{-2m}-1, j=0, \ldots N2^{-2m}-1\} \quad (16)$$

$$I_m^{HH} = \{(i,j) | i=M2^{-m}, \ldots M2^{-2m}-1, j=N2^{-m}, \ldots N2^{-2m}-1\} \quad (17)$$

Let $P_m^{HL}$, $P_m^{LH}$ and $P_m^{HH}$ be partitions of $I_m^{HL}$, $I_m^{LH}$ and $I_m^{HH}$, respectively.

A reduced size image with recognizable content is given by an output border and output image content. The border is given by a shape (e.g., rectangle) and a size (e.g., 68×80 pixels). In order to fill the border with image content, a resolution of the image and an anchor point position to locate the border is determined (e.g., coordinate (10,20) in resolution image $X_m$). An anchor point for a rectangle or square could be the upper left corner, while the anchor point for a circle may be the center.

In a first case, given a predetermined shape and size of the output border, the maximization problem is stated as $$(L_{display}, A_{display}) = \arg \max_{m \in \lambda, a \in A}\{\text{Cost}(M(X_m|_{output\_border})), \text{shape(output\_border)=fixed}, \text{size(output\_border)=fixed, anchor(output\_border)=variable}\}. \quad (18)$$

The reduced size image with recognizable content is then defined as $$\{x \in X_{Ldisplay}|_{output\_border}, \text{shape(output\_border)=fixed}, \text{size(output\_border)=fixed, anchor (output\_border)}=A_{diplay}\}.$$

In a second case, in addition, if the size of the template of the reduced size image with recognizable content is variable the maximization problem is $$(L_{display}, A_{display}, N_{display}) = \arg \max_{m \in \lambda, a \in A, n \in N}\{\text{Cost}(M(X_m|_{output\_border})), \text{shape(output\_border)=fixed}, n=\text{size(output\_border)=variable}, a=\text{anchor(output\_border)=variable}\}. \quad (19)$$

The reduced size image with recognizable content is then defined as $$\{x \in X_{Ldisplay}|_{output\_border}, \text{shape (output\_border)= fixed, size (output\_border)}=N_{display}, \text{anchor (output\_border)}=A_{display}\}.$$

In a third case, if anchor point of the output border, the size and shape of the template of the reduced size image with recognizable content are variable the maximization problem is stated above.

$$(L_{display}, A_{display}, N_{display}, S_{display}) = \arg \max_{m \in \lambda, n \in N, s \in S}\{\text{Cost}(M(X_m|_{output\_border})), s=\text{shape(output\_border)=variable}, n=\text{size(output\_border)=variable}, a=\text{anchor(output\_border)=variable}\}. \quad (20)$$

The reduced size image with recognizable content is then defined as $$\{x \in X_{Ldisplay}|_{output\_border}, \text{ shape (output\_border)} = S_{display}, \text{ size (output\_border)} = N_{display}, \text{ anchor (output\_border)} = A_{display}\}.$$

In this case, the vector ($L_{display}$, $A_{display}$, $N_{display}$, $S_{display}$) determines the reduced size image with recognizable content.

In the first case, the location and resolution selection for the fixed reduced size image with recognizable content are image content and display device dependent. The size and shape of the reduced size image with recognizable content border are application or user dependent. In the second case, location, resolution and reduced size image with recognizable content size, and in the third case location, resolution size and shape of the reduced size image with recognizable content are image content and display device dependent.

The four-dimensional vector ($L_{display}$, $A_{display}$, $N_{display}$, $S_{display}$) determines the reduced size image with recognizable content. An extension is possible by allowing the entries in the vector to be vectors. In this case a reduced size image with recognizable content would be a collection of selected resolution segments with specific output borders. The segments may be chosen such that their full-resolution versions cover the entire image, either overlapping or non-overlapping. This is referred to herein as a Multiscale Collage.

In general, given an image the method creates an optimal thumbnails for a given set of constrains on the vector ($L_{display}$, $A_{display}$, $Ndisplay$, $S_{display}$). In this case, a reduced size image with recognizable content is a combination of specifically selected resolution segments. In the scalar and vector case, postprocessing can be applied to the resolution segments, such as interpolation, extrapolation, warping, blurring, etc.

Scale Selection Using Meta Data Created by a JPEG2000 Image Coder

The codestream of an image created by a JPEG2000 ("J2K") image coder orders the wavelet domain image data into organizational units, such as packets, codeblocks, or tiles. Those units contains header information including features such as a number of zero bitplanes or unit code length. In one embodiment, those features are used to determine the importance measure M (e.g., entropy) and the cost function Cost. The partition of wavelet domain image data is then given by the choice of the code units (e.g., code blocks). Those data are easily accessible without decoding the actual image data and lead to very fast implementations of reduced size image creations.

In order to perform scale selection using J2K meta data, the partitioning of the wavelet domain into cells is given by codeblocks. The image domain may be given by tiles.

For global scale section, the entropy of a subband is given as the sum of length of codeblocks contained in the subband. The metrics described above in conjunction with global scale selection may be applied and the reduced size image with recognizable content computed.

For local scale selection, if the image is given in tiles, then the local scale selection approach described above with respect to partitioning the image domain into segments may be used. Alternatively, for local scale selection using J2K meta data, the local scale selection approach described above with respect to partitioning the wavelet domain into cells may be used where the wavelet cells are the code blocks and M measures the entropy of a codeblock.

A combination of global and local scale section may be used. For example, if the output border size and shape are not constrained, global selection may be attempted initially. After doing so, if the calculated resolution is out of the range x, then local scale selection may be started. In one embodiment, local scale section is started under a constraint (e.g., a rectangular shape). For example, if image is square, then global scale selection produces a square. If global scale selection does not work, then local scale selection should be applied given the constraint that the shape should be a square not bigger than a specific size.

The following is an example for combined global and local scale selection for two different displays. Two different display devices are considered, one is a CRT desktop monitor and one an LCD display of a PDA device. The physical properties of those displays are listed in Table 1.

TABLE 1

Physical characteristics of two different display devices

| | absolute pixel resolution | dpi resolution | contrast ratio |
|---|---|---|---|
| CRT desktop | 1280 × 1024 | 95 | 260:1 |
| LCD PDA | 320 × 320 | 140 | 190:1 |

Table 2 lists the calculated parameters $L_{min}$, $D_{min}$, and $L_{max}$. The parameter $C_{device}$ is set, e.g., by tuning or by using the ratio of the display contrast ratio to the contrast ratio of a reference display.

TABLE 2

Parameters derived from display properties

| | CRT desktop | LCD PDA |
|---|---|---|
| $L_{min}$ | 0 | 2 |
| $D_{min}$ | 7 | 11 |
| $C_{device}$ | 1 | 260/190 = 1.37 |
| $L_{max}$ | 7 | 4 |

Global scale selection determines $L_{display}=5$ for the CRT device. For the LCD device global scale selection is $L_{display}=5$. But that is larger than $L_{max}$. Therefore local scale selection starts, a square shape of 300×300 pixels is fixed and it is searches for the location and resolution L in the interval $[0,L_{max}]$ that results in the best fit, i.e. maximizes the cost function.

Applications

There are several ways to incorporate the concept of global and local scale selection into possible design choices for creating reduced size image. In general, they can be separated into five groups.

In one embodiment, an image is created that contains information of only one image segment such that the LL component of this segment at its calculated display scale fits into a given shape of fixed size (e.g., a 68×88 pixel rectangle). In this manner, the image then contains the LL component of the segment at a calculated display scale.

Figure 23:
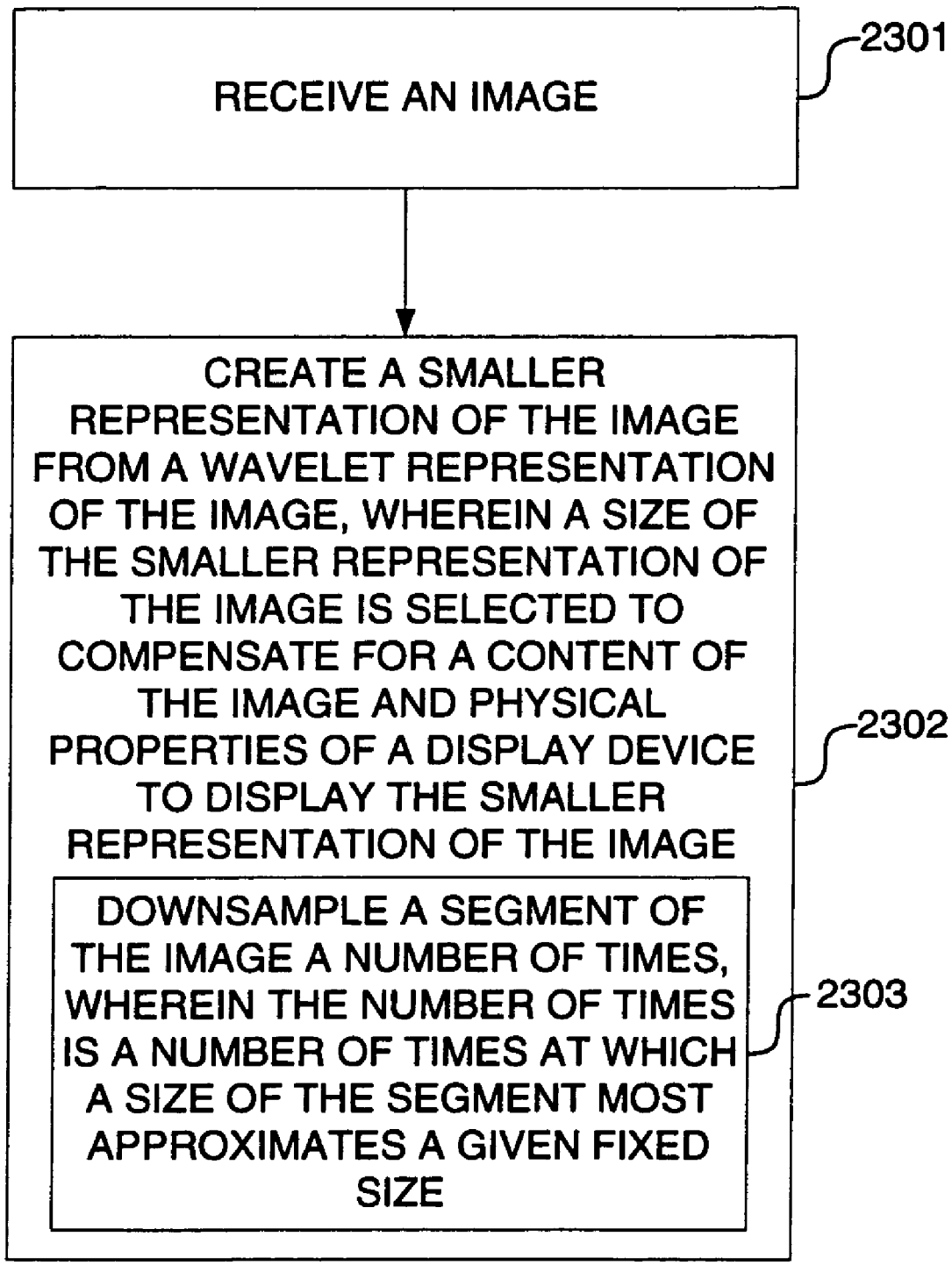
FIG. 23 is a flow diagram of one embodiment of a process for computing an image representation that is visually recognizable when being displayed on a given display device.

FIG. 23 is a flow diagram of one embodiment of a process for computing an image representation that is visually recognizable when being displayed on a given display device. Referring to FIG. 23, processing logic receives an image (processing block 2301). Processing logic then creates a smaller representation of the image from a wavelet representation of the image, where the size of the smaller representation of the image is selected based on the content of the image and physical properties of a display device to display the smaller representation of the image (processing block 2302). As shown in FIG. 23, as part of creating the smaller representation, processing logic downsamples the image a number of times (processing block 2303). The number of times is a number of times at which a size of a selected segment best approximates a given fixed size.

In one embodiment, a reduced size image is created that contains information of only one segment of the image at a particular LL resolution level $L_{display}$. The shape of the reduced size image is fixed, but its size is flexible. For example, a reduced size image shape could be a rectangle of a certain width/height ratio R. The reduced size image then contains the image segment at its associated resolution, such that it satisfies the "best-fit" criterion over all considered rectangles of ratio R.

Figure 24:
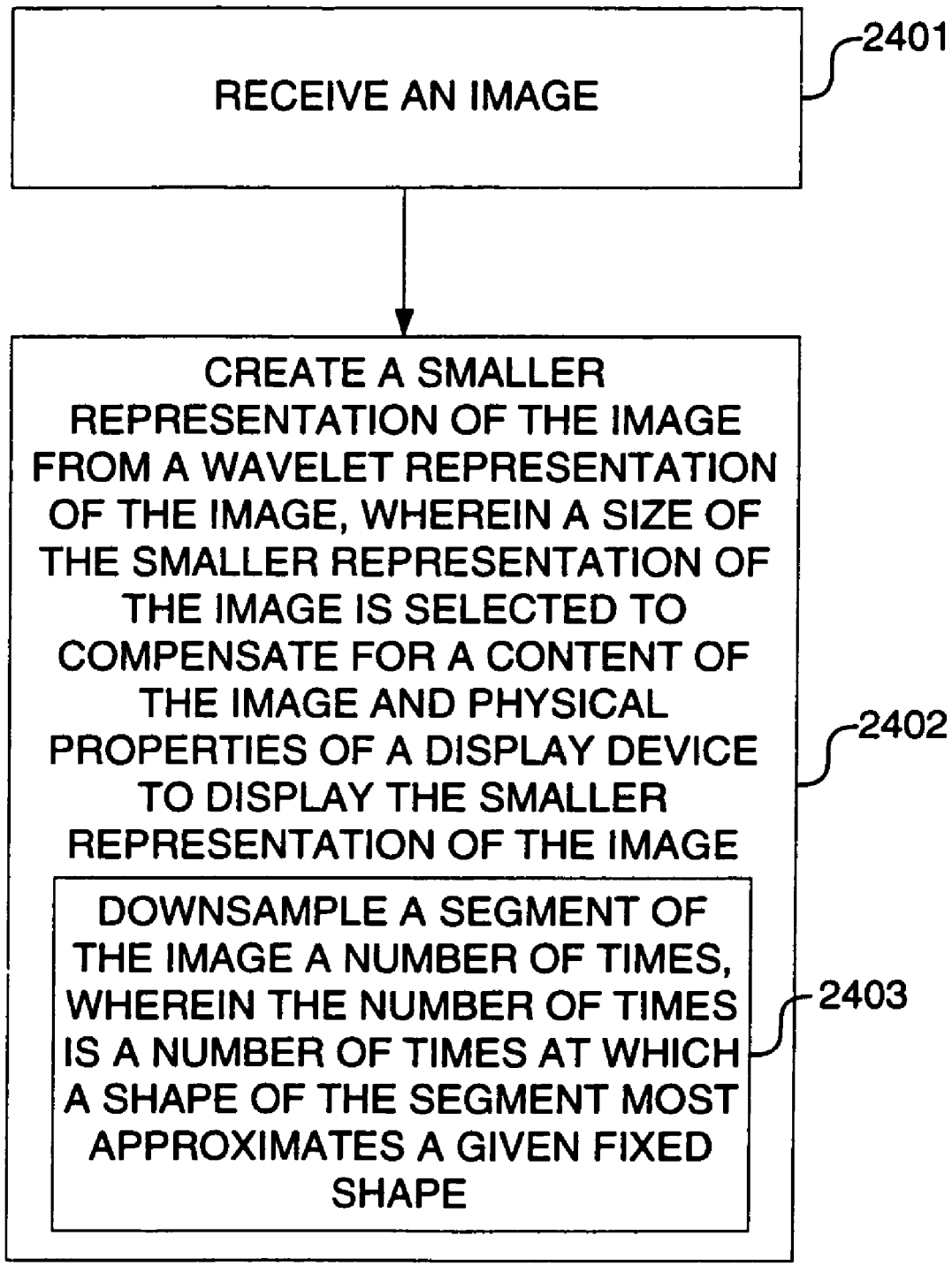
FIG. 24 is a flow diagram of one embodiment of a process for computing an image representation that is visually recognizable when being displayed on a given display device.

FIG. 24 is a flow diagram of one embodiment of a process for computing an image representation that is visually recognizable when being displayed on a given display device. Referring to FIG. 24, processing logic receives an image (processing block 2401). Processing logic then creates a smaller representation of the image from a wavelet representation of the image, where the size of the smaller representation of the image is selected based on the content of the image and physical properties of a display device to display the smaller representation of the image (processing block 2402). As shown in FIG. 24, as part of creating the smaller representation, processing logic downsamples the image a number of times (processing block 2402). The number of times is a number of times at which a shape of the segment most approximates a given fixed shape.

In one embodiment, a reduced size image is created that contains information of only one segment of the image at a particular resolution. The reduced size image shape and size are then flexible.

Figure 25:
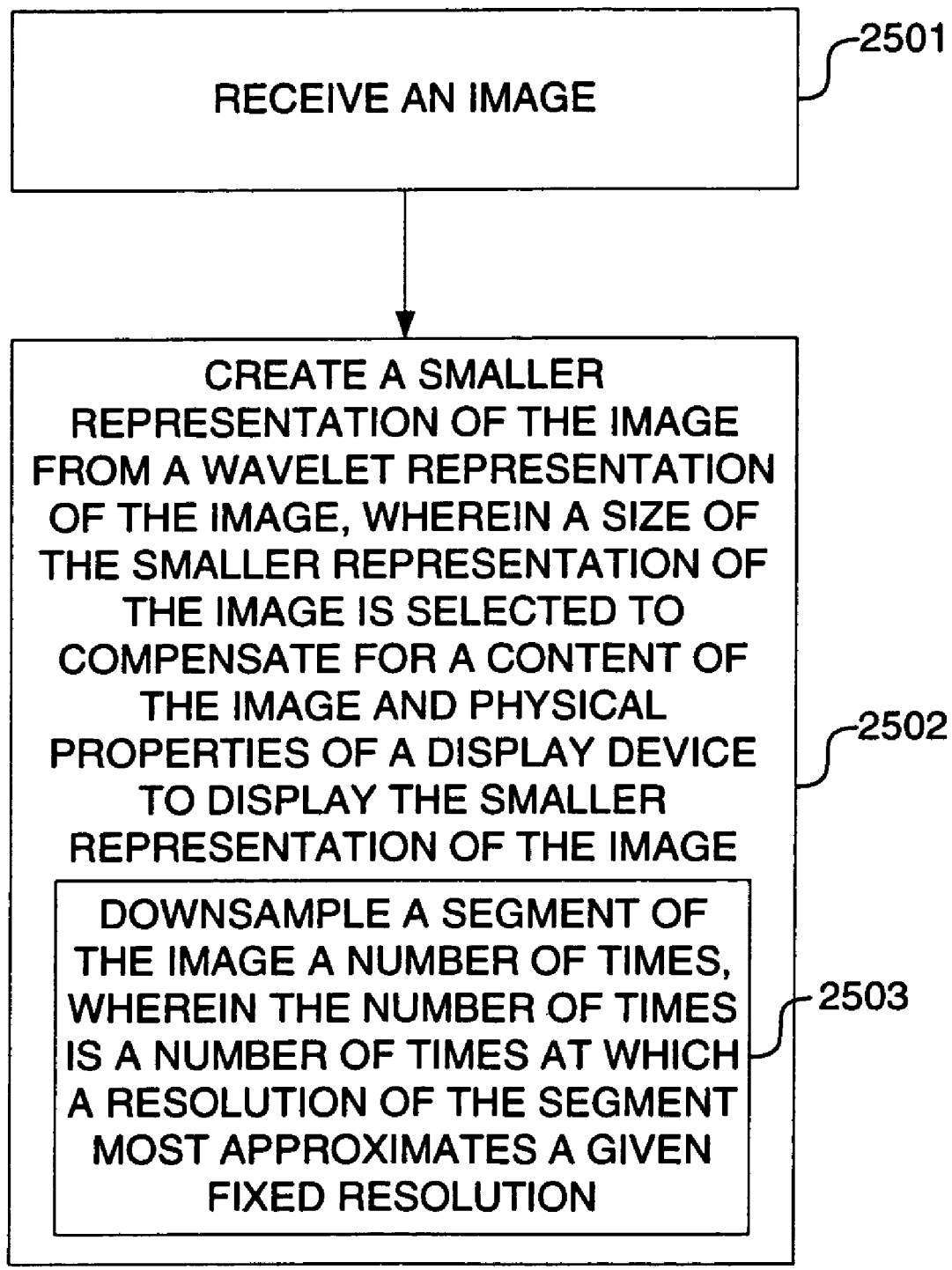
FIG. 25 is a flow diagram of one embodiment of a process for computing an image representation that is visually recognizable when being displayed on a given display device.

FIG. 25 is a flow diagram of one embodiment of a process for computing an image representation that is visually recognizable when being displayed on a given display device. Referring to FIG. 25, processing logic receives an image (processing block 2501). Processing logic then creates a smaller representation of the image from a wavelet representation of the image, where the size of the smaller representation of the image is selected based on the content of the image and physical properties of a display device to display the smaller representation of the image (processing block 2402). As shown in FIG. 25, as part of creating the smaller representation processing logic downsamples the image a number of times (processing block 2503). The number of times is a number of times at which a resolution of the selected segment best approximates a given fixed resolution.

In one embodiment, a reduced size image is created that contains several segments of the image, each displayed at the LL component at its display level (i.e., a multiscale collage).

In one embodiment, a reduced size image is created that contains several segments of the image. Each segment is displayed at the LL component at its display level, with post-processing further performed on the LL component that affects the values of LL coefficients as well as the shapes of the displayed segments. Examples of such post-processing operations include extrapolation, blurring, stylizing, enhancing, fusing, warping, morphing, etc. The design space for reduced size images is symbolized in Table 3.

TABLE 3

Matrix Of Reduced Size Image Design Features

| | Fixed(f) | selection from list(s) | unconstrained(u) |
|---|---|---|---|
| Shape | Prior art | New invention | New invention |
| Size | Prior art | New invention | New invention |

TABLE 3-continued

Matrix Of Reduced Size Image Design Features

| | Fixed(f) | selection from list(s) | unconstrained(u) |
|---|---|---|---|
| Location | Prior art | New invention | New invention |
| Resolution | Prior art | New invention | New invention |
| post-processing steps, e.g., blurring, warping. | New invention | New invention | New invention |

Figure 26:
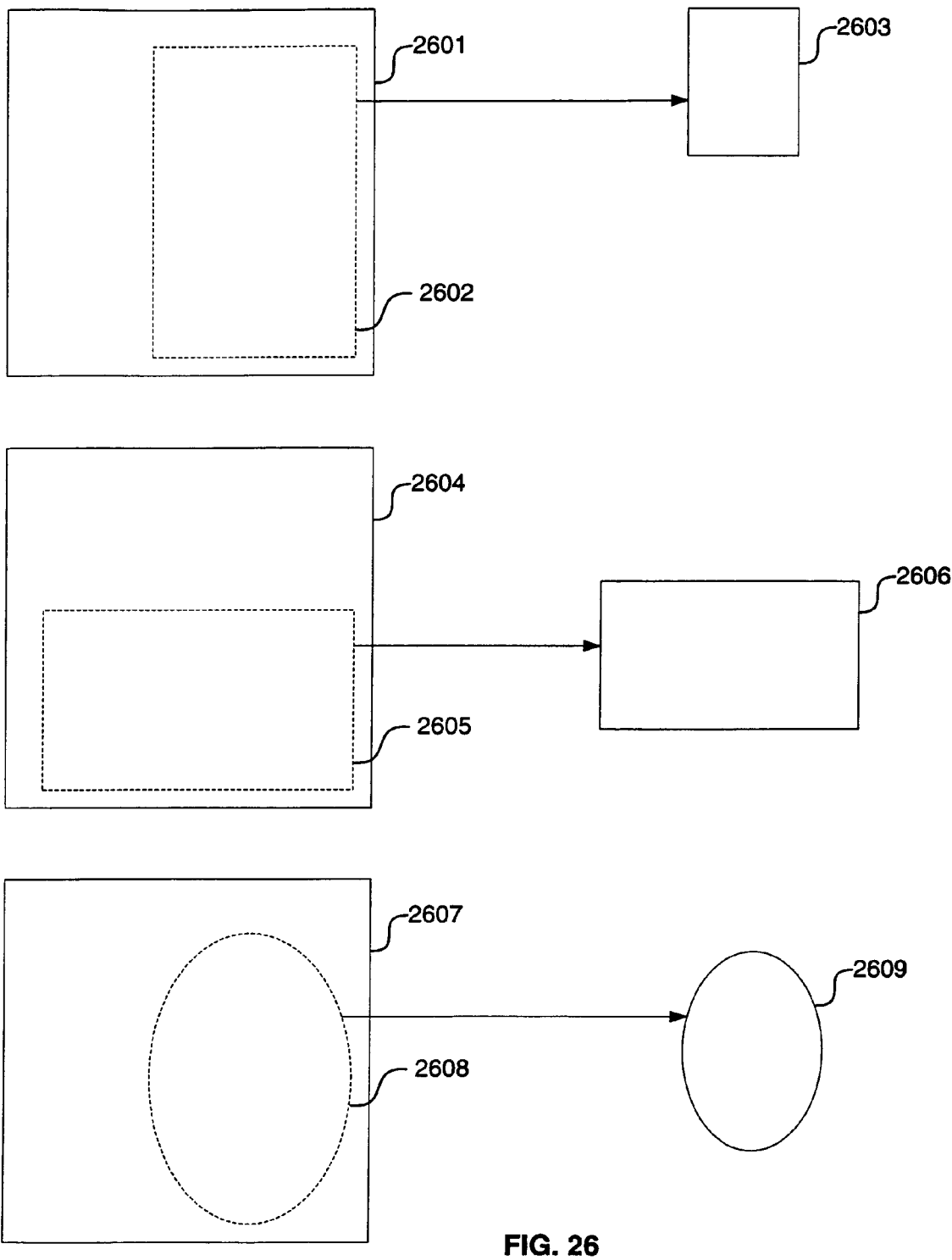
FIG. 26 illustrates exemplary design choices.

FIG. 26 illustrates reduced size image design choices according to one embodiment. In one embodiment, from entire image 2601, an image segment 2602 is selected. A smaller representation 2603 of the segment 2602 is created by downsampling the segment 2602 a number of times. The number of times is a number of times at which a size of the segment most approximates a given fixed size (e.g., 68×88 pixels). In an alternative embodiment, from entire image 2604, an image segment 2605 is selected. A smaller representation 2606 of the segment 2605 is created by downsampling the segment 2605 a number of times. The number of times is a number of times at which a resolution of the segment best approximates a given fixed resolution (e.g., a rectangle of a fixed width/height ratio). In an alternative embodiment, from entire image 2607, an image segment 2608 is selected. A smaller representation 2609 of the segment 2608 is created by downsampling the segment 2608 a number of times. The number of times is a number of times at which a shape of the segment best approximates a given fixed shape (e.g., a shape selected from a list of shapes and flexible sizes).

Figure 27:
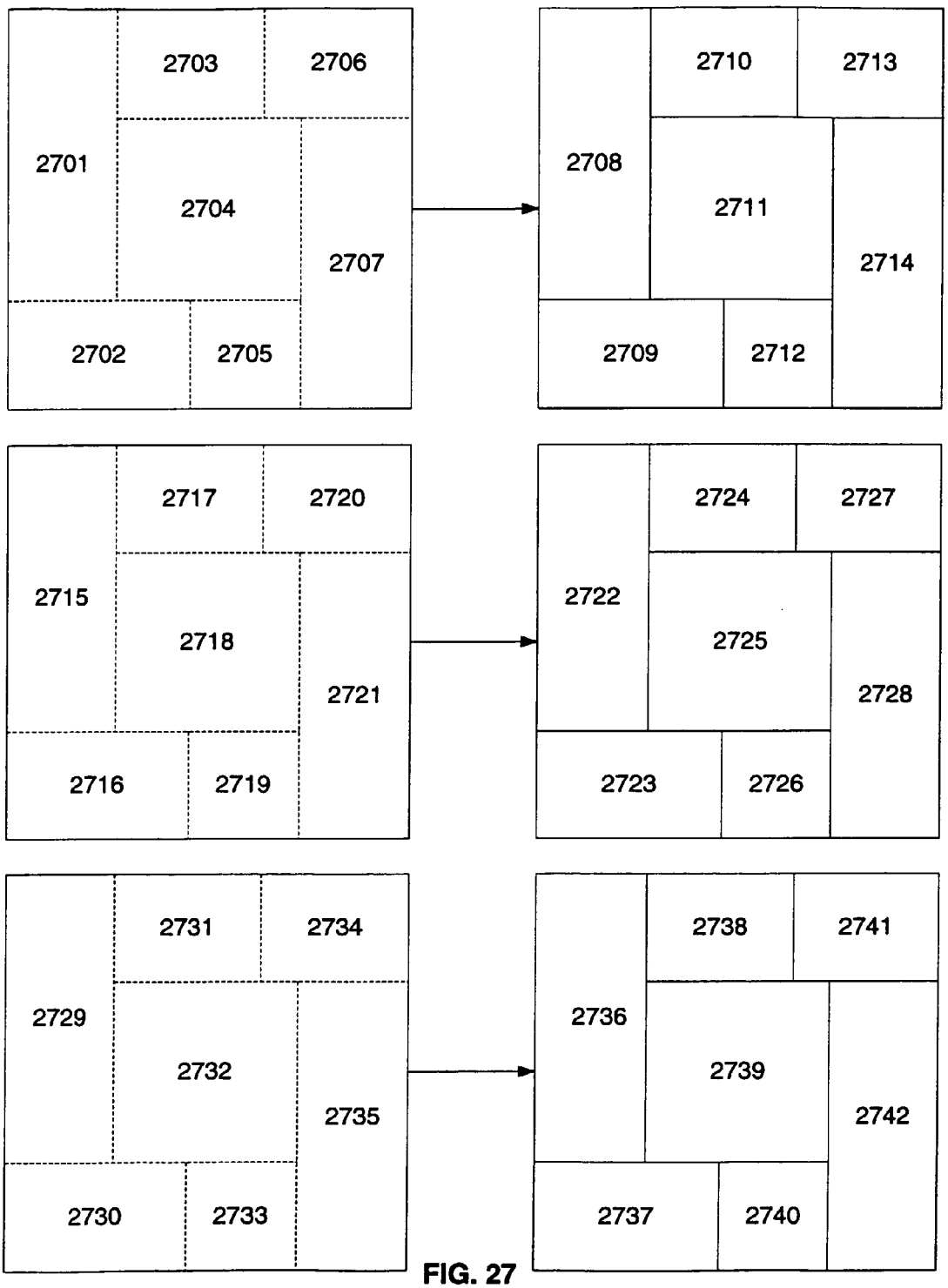
FIG. 27 illustrates additional exemplary design choices.

FIG. 27 illustrates exemplary reduced size image design choices. In one embodiment, selected image segments 2701-2707 are each downsampled to varying extents. The resulting multiscale collage contains, for example, segments 2708, 2712, and 2713 at 25% of the sizes of their original counterparts. Segments 2702 and 2703 are, for example, 50% of the sizes of their original counterparts. Segment 2714 is at just 12.5% of its original counterpart. Finally, segment 2711 remains at 100% of the size of its original counterpart, segment 2704.

In one embodiment, selected image segments 2715-2721 are upsampled from an LL component by a factor. In the resulting multiscale collage, for example, segments 2722, 2726, and 2727 are upsampled by a factor of 2× from their scale selected LL components. Segments 2723 and 2724 are upsampled by a factor of 1× from their scale selected LL components. Segment 2728 is upsampled by a factor of 3× from its scale selected LL components. Finally, segment 2725 remains at the original size from its original counterpart, segment 2718.

In one embodiment, selected image segments 2729-2735 are upsampled in the same manner as segments 2715-2721. Furthermore, each corresponding segment 2736-2742 in a resulting multiscale collage is post-processing enhanced, warped, blurred, etc.

The embodiments above may be applied to digital camera displays, digital photo album software, image browsing, video summaries, page layout, and web page design. In applications such as these, the display range parameters $L_{min}$ and $L_{max}$ are in one embodiment set by the user and are potentially adjusted during the use of the reduced size image creation system. In one embodiment operating system, parameters such as absolute pixel resolution are extracted from the display settings without requiring any user effort. In the above description, only downsampling by a factor of two was considered due to its natural appearance in the wavelet decomposition. It is clear to one skilled in the art, however, that the approaches to reduced size image creation can also be extended to sampling ratios other than powers of two by interpolation or extrapolation of selected segments at specific resolutions.

Figure 28:
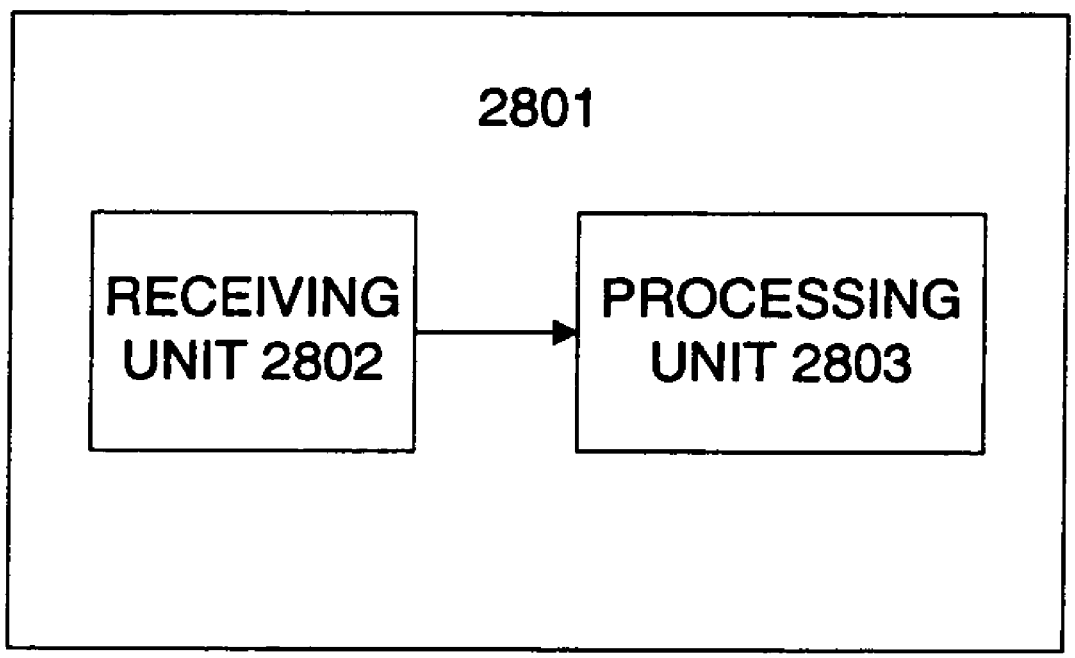
FIG. 28 is a block diagram of one embodiment of a device for computing an image representation that is visually recognizable when being displayed on a given display device.

FIG. 28 is a schematic diagram illustrating a device for computing an image representation that is visually recognizable when being displayed on a given display device according to one embodiment. The device 2801 comprises a receiving unit 2802 to receive an image, and a processing unit 2803 coupled with the receiving unit 2802. The processing unit 2803 creates a smaller representation of the image from a wavelet representation of the image, wherein a size of the smaller representation of the image is selected to compensate for a content of the image and physical properties of a display device (not shown) to display the smaller representation of the image. In one embodiment, to create a smaller representation of the image from a wavelet representation of the image, processing unit 2803 downsamples the image a number of times, wherein the number of times is large enough to cause the smaller representation of the image to be completely visible on the display device. In one embodiment, to create a smaller representation of the image from a wavelet representation of the image, processing unit 2803 downsamples the image a number of times, wherein the number of times depends proportionately on a ratio of coarse structures in the image to fine structures in the image. In one embodiment, to create a smaller representation of the image from a wavelet representation of the image, processing unit 2803 denoises coefficients. In one embodiment, to create a smaller representation of the image from a wavelet representation of the image, processing unit 2803 downsamples the image a number of times, wherein the number of times is a number of times at which a ratio of wavelet coefficients in a class of significant features to wavelet coefficients in a class of insignificant features is highest. In one embodiment, to create a smaller representation of the image from a wavelet representation of the image, processing unit 2803 downsamples a segment of the image a number of times, wherein the number of times is a number of times at which a size of the segment most approximates a given fixed size. In one embodiment, to create a smaller representation of the image from a wavelet representation of the image, processing unit 2803 downsamples a segment of the image a number of times, wherein the number of times is a number of times at which a shape of the segment most approximates a given fixed shape. In one embodiment, to create a smaller representation of the image from a wavelet representation of the image, processing unit 2803 downsamples a segment of the image a number of times, wherein the number of times is a number of times at which a resolution of the segment most approximates a given fixed resolution. In one embodiment, to create a smaller representation of the image from a wavelet representation of the image, processing unit 2803 downsamples the image a number of times, wherein the number of times is small enough to cause a number of dots in a diameter of the object to be at least as large as a number of dots in the minimal visible object diameter. In one embodiment, to create a smaller representation of the image from a wavelet representation of the image, processing unit 2803 downsamples the image a number of times, wherein the number of times is a number of times at which a trend changes from an importance measure increasing each time to the importance measure decreasing each time. In one embodiment, to create a smaller representation of the image from a wavelet representation of the image, processing unit 2803 partitions the image into cells segments and downsample segments. In one embodiment, to partition the image into cells, processing unit 2803 partitions the image by JPEG2000 code units.

The techniques described herein may be extended to color. For color images, all these techniques can be used on one chromatic band (e.g., L* inCIEL*uv, Yin Yuv, or G in sRGB) or on some or all. If more than one chromatic band is used, a technique can be used to combine results. Also, the techniques described herein may be extended to time (e.g., motion, video). In such a case, objects may be identified to track in thumbnail and/or key frame may be located, and then subsequently processed.

An Exemplary Computer System

Figure 29:
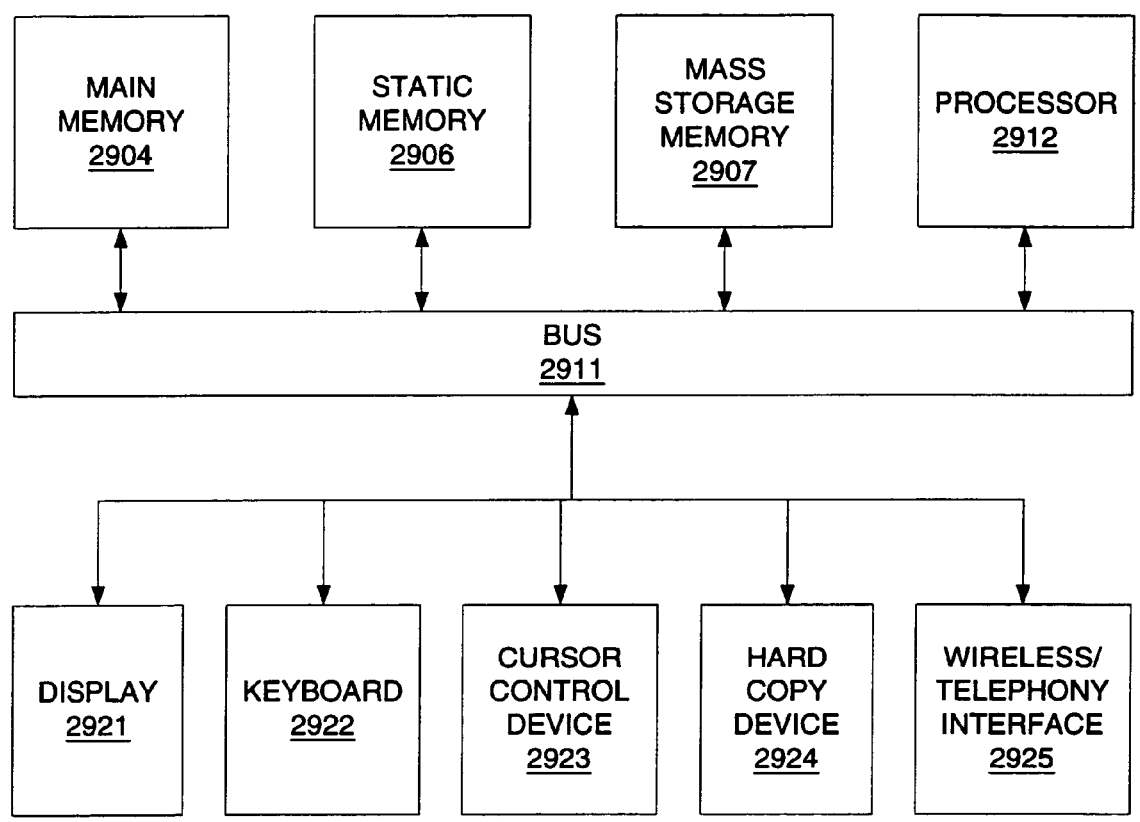
FIG. 29 is a block diagram of an exemplary computer system.

FIG. 29 is a block diagram of an exemplary computer system that may perform one or more of the operations described herein. Referring to FIG. 29, computer system 2900 may comprise an exemplary client 2950 or server 2900 computer system. Computer system 2900 comprises a communication mechanism or bus 2911 for communicating information, and a processor 2912 coupled with bus 2911 for processing information. Processor 2912 includes a microprocessor, but is not limited to a microprocessor, such as, for example, Pentium™, PowerPC™, etc.

System 2900 further comprises a random access memory (RAM), or other dynamic storage device 2904 (referred to as main memory) coupled to bus 2911 for storing information and instructions to be executed by processor 2912. Main memory 2904 also may be used for storing temporary variables or other intermediate information during execution of instructions by processor 2912.

Computer system 2900 also comprises a read only memory (ROM) and/or other static storage device 2906 coupled to bus 2911 for storing static information and instructions for processor 2912, and a data storage device 2907, such as a magnetic disk or optical disk and its corresponding disk drive. Data storage device 2907 is coupled to bus 2911 for storing information and instructions.

Computer system 2900 may further be coupled to a display device 2921, such as a cathode ray tube (CRT) or liquid crystal display (LCD), coupled to bus 2911 for displaying information to a computer user. An alphanumeric input device 2922, including alphanumeric and other keys, may also be coupled to bus 2911 for communicating information and command selections to processor 2912. An additional user input device is cursor control 2923, such as a mouse, trackball, trackpad, stylus, or cursor direction keys, coupled to bus 2911 for communicating direction information and command selections to processor 2912, and for controlling cursor movement on display 2921.

Another device that may be coupled to bus 2911 is hard copy device 2924, which may be used for printing instructions, data, or other information on a medium such as paper, film, or similar types of media. Furthermore, a sound recording and playback device, such as a speaker and/or microphone may optionally be coupled to bus 2911 for audio interfacing with computer system 2900. Another device that may be coupled to bus 2911 is a wired/wireless communication capability 2925 to communication to a phone or handheld palm device.

Note that any or all of the components of system 2900 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method comprising:
receiving an image; and
creating a smaller representation of the image from a wavelet representation of the image, including selecting display size of the smaller representation of the image based on content of the image and at least one physical property of a display device to display the smaller representation of the image.

2. The method defined in claim 1, further comprising selecting an output shape, resolution and application for the smaller representation based on content of the image and at least one physical property of a display device to display the smaller representation of the image.

3. The method of claim 1, wherein creating a smaller representation of the image from a wavelet representation of the image includes downsampling the image a number of times large enough to cause an entirety of the smaller representation of the image to be visible on the display device.

4. The method of claim 1, wherein creating a smaller representation of the image from a wavelet representation of the image includes varying display window size of a segment of the image for at least one of a given fixed segment shape and a given fixed segment resolution.

5. The method of claim 1, wherein creating a smaller representation of the image from a wavelet representation of the image includes varying at least one of a segment of the image for a given fixed display window size, and a segment shape of a segment of the image for a given fixed display window size.

6. The method of claim 1, wherein the size of the smaller representation of the image depends on pixels per viewing angle of the display device.

7. The method of claim 1, wherein creating a smaller representation of the image from a wavelet representation of the image includes partitioning the image into segments and downsampling each of the segments a number of times.

8. The method of claim 7, wherein partitioning the image into segments includes partitioning the image by JPEG2000 code units.

9. The method defined in claim 7, further comprising selecting one or more segments for display that are grouped into connected components.

10. The method of claim 1, wherein creating a smaller representation of the image from a wavelet representation of the image includes partitioning the wavelet domain into cells.

11. The method defined in claim 1, further comprising displaying only parts of the image that are associated with a particular display scale.

12. An apparatus comprising:
a receiving unit to receive an image; and
a processing unit coupled with the receiving unit, the processing unit to create a smaller representation of the image from a wavelet representation of the image, including selecting display size of the smaller representation of the image based on content of the image and at least one physical property of a display device to display the smaller representation of the image.

13. The apparatus of claim 12, further comprising the processing unit to select an output shape, resolution and application for the smaller representation based on content of the image and at least one physical property of a display device to display the smaller representation of the image.

14. The apparatus of claim 12, wherein the processing unit to create a smaller representation of the image from a wavelet representation of the image includes downsampling the image a number of times large enough to cause an entirety of the smaller representation of the image to be visible on the display device.

15. The apparatus of claim 12, wherein the processing unit to create a smaller representation of the image from a wavelet representation of the image includes varying display window size of a segment of the image for at least one of a given fixed segment shape and a given fixed segment resolution.

16. The apparatus of claim 12, wherein the processing unit to create a smaller representation of the image from a wavelet representation of the image includes varying at least one of a segment of the image for a given fixed display window size, and a segment shape of a segment of the image for a given fixed display window size.

17. An article of manufacture including a machine readable medium that provides instructions that, when executed by a machine, cause the machine to perform operations comprising:
receiving an image; and
creating a smaller representation of the image from a wavelet representation of the image, including selecting display size of the smaller representation of the image based on content of the image and at least one physical property of a display device to display the smaller representation of the image.

18. The article of manufacture of claim 17, wherein the size of the smaller representation of the image depends on pixels per viewing angle of the display device.

19. The article of manufacture of claim 17, wherein creating a smaller representation of the image from a wavelet representation of the image includes partitioning the image into segments and downsampling each of the segments a number of times.

20. The article of manufacture of claim 17, wherein creating a smaller representation of the image from a wavelet representation of the image includes partitioning the wavelet domain into cells.

\* \* \* \* \*